(12) United States Patent
Hirayama et al.

(10) Patent No.: US 6,946,626 B2
(45) Date of Patent: Sep. 20, 2005

(54) STATE CONTROLLER APPARATUS

(75) Inventors: Hirofumi Hirayama, Tokyo (JP);
Hiroyuki Kato, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 10/415,930
(22) PCT Filed: Dec. 12, 2000
(86) PCT No.: PCT/JP00/08780

§ 371 (c)(1),
(2), (4) Date: May 5, 2003

(87) PCT Pub. No.: WO02/49181

PCT Pub. Date: Jun. 20, 2002

(65) Prior Publication Data

US 2004/0099653 A1 May 27, 2004

(51) Int. Cl.$^7$ ................................................ H05B 1/02
(52) U.S. Cl. ...................................... 219/492; 219/497
(58) Field of Search ............................... 219/482–487, 219/492, 497; 307/39–41

(56) References Cited

U.S. PATENT DOCUMENTS

| | | | | |
|---|---|---|---|---|
| 4,100,428 A | * | 7/1978 | Delisle et al. ............... | 219/485 |
| 4,160,153 A | * | 7/1979 | Melander .................... | 219/485 |
| 4,829,159 A | * | 5/1989 | Braun et al. ................ | 219/486 |
| 4,882,501 A | * | 11/1989 | Konig et al. ................. | 307/11 |
| 4,920,252 A | * | 4/1990 | Yoshino ..................... | 219/497 |
| 5,105,067 A | * | 4/1992 | Brekkestran et al. ........ | 219/497 |
| 5,687,139 A | * | 11/1997 | Budney ........................ | 307/39 |
| 5,927,598 A | * | 7/1999 | Broe ............................ | 307/39 |
| 6,023,052 A | * | 2/2000 | Carl et al. ................... | 219/483 |
| 6,124,576 A | * | 9/2000 | Zapf et al. .................. | 219/485 |
| 6,600,237 B1 | * | 7/2003 | Meissner ..................... | 307/41 |

\* cited by examiner

*Primary Examiner*—Teresa J. Walberg
(74) *Attorney, Agent, or Firm*—Rothwell, Figg, Ernst & Manbeck, PC

(57) ABSTRACT

A state control apparatus includes a calculator for calculating adjustment amounts for adjusting a plurality of end effecting devices on the basis of preset values and measured amounts measured by a plurality of meters. The measured amounts indicate respective states of the end effecting devices. The adjustment amounts are required for conforming the measured amounts to the preset values, respectively. The state control apparatus further includes a parameter generator for generating a plurality of parameters on the basis of settings by a user. The state control apparatus further includes a comprehensive controller for outputting activating signals for activating the respective end effecting devices based on the respective adjustment amounts and the plurality of parameters. When the comprehensive controller outputs one of the activating signals for activating one of the end effecting devices, the comprehensive controller does not output the other activating signals for activating the other end effecting devices.

16 Claims, 16 Drawing Sheets

FIG.5

| | |
|---|---|
| TARGET TEMPERATURE | CH1: 150°C, CH2: 150°C, CH3: 150°C, CH4: 150°C |
| CYCLE-TIME | 10.0 sec |
| GROUPING | NONUSE |
| | USE (GP1: CH? CH? CH? <br> GP2: CH? CH? CH? <br> GP3: CH? CH? CH?) |
| DEACTIVATION-TO-ACTIVATION TIME LAG | 0 sec |
| OUTPUT-RESTRICTION | CH1: 100%, CH2: 100%, CH3: 100%, CH4: 100% |
| MODE | A, B, C, D, E |
| TIME ALLOCATION | NONUSABLE USE (CH1: %, CH2: %, CH3: %, CH4: %,) |
| INTERCHANNEL ACTIVATION TIME LAG | NONUSABLE LAG LENGTH (0.0 sec) |

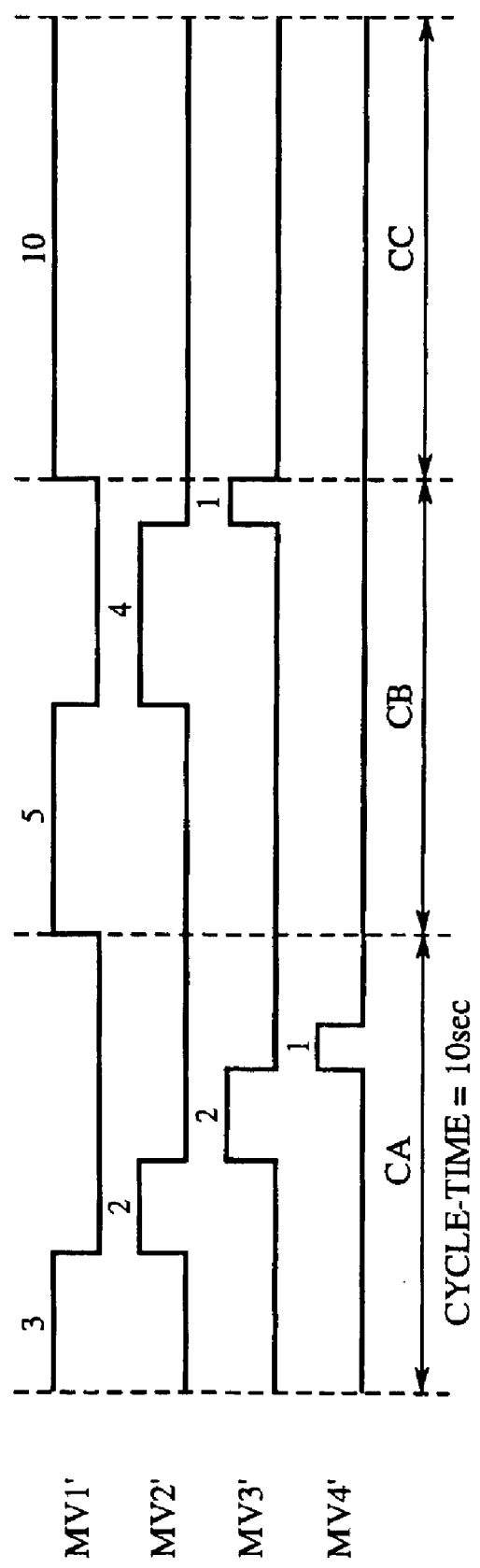

STATE CONTROLLER APPARATUS

CROSSREFERENCE TO RELATED APPLICATION

This application is a 35 USC 371 National Phase Entry Application from PCT/JP00/08780, filed Dec. 12, 2000.

TECHNICAL FIELD

The present invention relates to a state control apparatus. More specifically, the present invention relates to a state control apparatus for activating a plurality of end effecting devices harmonically under restricted power consumption.

BACKGROUND ART

Generally, a plurality of independent control loops have been provided for managing states of a plurality of controlled subjects (end effecting devices), e.g., temperatures of heaters. Each control loop is provided with a controller, such as a PID (proportional integral differential) processor for controlling the corresponding end effecting device. In a system including a plurality of control loops, a plurality of end effecting devices may be frequently activated at the same period, thereby increasing power consumption temporarily. Therefore, high capabilities are required for a breaker and other elements arranged in each control loop.

JP-A-11-262174 discloses a temperature controller that performs time-division control wherein when one of heaters is activated, the other heaters are not activated, thereby preventing power consumption from increasing temporarily. This controller allocates one cycle among the effective periods for activating heaters in accordance with respective heating capabilities of heaters. That is, the controller allocates a shorter period to a heater that can rise the temperature quickly while allocating a longer period to a heater that rises the temperature slowly in order that all heaters enter the steady state substantially simultaneously. Accordingly, it is possible to shorten the period for waiting for the steady-state entry of the heater with a lower heating capability in a semiconductor plant or another facility where the temperature controller is installed.

However, in a sort of state management of end effecting devices, states of a plurality of end effecting devices should be frequently controlled on the basis of not only a single factor such as heating capability, but also various factors. For example, in a plant including a main control loop that needs a quick control and an auxiliary control loop that does not need it, the main control loop will be controlled preferentially. Conventional state control apparatuses are insufficient to accomplish such a complex or compound control.

The present invention may provide a state control apparatus that activates and controls a plurality of end effecting devices harmonically on the basis of a variety of factors and under restricted power consumption.

DISCLOSURE OF INVENTION

A state control apparatus according to the present invention includes a calculator for calculating adjustment amounts for adjusting a plurality of end effecting devices on the basis of preset values and measured amounts measured by a plurality of meters. The measured amounts indicate respective states of the end effecting devices. The adjustment amounts are required for conforming the measured amounts to the preset values, respectively. The state control apparatus further includes a parameter generator for generating a plurality of parameters on the basis of settings by a user. The state control apparatus further includes a comprehensive controller for outputting activating signals for activating the respective end effecting devices based on the respective adjustment amounts and the plurality of parameters. When the comprehensive controller outputs one of the activating signals for activating one of the end effecting devices, the comprehensive controller does not output the other activating signals for activating the other end effecting devices. With such a structure, the plurality of end effecting devices can be activated and controlled harmonically in accordance with a variety of parameters instructed by the user. Furthermore, since activating signals for a plurality of end effecting devices are not output simultaneously, the end effecting devices may be activated under restricted power consumption.

In the state control apparatus, the parameter generator may generate a prioritization parameter indicating a prioritization among the end effecting devices. The comprehensive controller may preferentially output the activating signal for activating the end effecting device having a higher priority indicated by the prioritization parameter in a cycle-time that is capable of being allocated for activating the end effecting devices sequentially. The comprehensive controller may output the other activating signal for activating the remaining end effecting devices having lower priorities indicated by the prioritization parameter in a remaining period in the cycle-time after a period for outputting the activating signal for activating the end effecting device having the higher priority. With such a structure, while a specific end effecting device may be activated for a longer period preferentially, the other end effecting devices may be activated.

In the state control apparatus, the comprehensive controller may allocate the remaining period among activation periods for the remaining end effecting devices in such a manner that the respective activation periods for the remaining end effecting devices are proportional to the corresponding adjustment amounts. With such a structure, proper actual activation time periods, each of which is proportional to the corresponding adjustment amount, are assigned to the remaining end effecting devices.

In the state control apparatus, the parameter generator may generate a limitation parameter corresponding to a limitation of time period for activating at least one of the end effecting devices in a cycle-time that is capable of being allocated for activating the end effecting devices sequentially. The comprehensive controller may adjust outputs of the activating signals for the end effecting devices on the basis of parameters including the limitation parameter. With such a structure, the periods for activating the end effecting devices may be limited appropriately in accordance with application, environment, property, and other factors.

In the state control apparatus, the parameter generator may generate a limitation parameter corresponding to a limitation of time period for activating at least one of the end effecting devices in a cycle-time that is capable of being allocated for activating the end effecting devices sequentially, and may generate a prioritization parameter indicating a prioritization among the end effecting devices. The comprehensive controller may adjust outputs of the activating signals for the end effecting devices on the basis of the limitation parameter and the prioritization parameter. With such a structure, while a specific end effecting device may be activated for a longer period preferentially, the longer period for activating the high priority end effecting device may be limited appropriately in accordance with application, environment, property, and other factors.

In the state control apparatus, when a sum of the adjustment amounts for the end effecting devices is in excess of an amount corresponding to a length of a cycle-time that is capable of being allocated for activating the end effecting devices sequentially, the comprehensive controller may multiply each ratio of each adjustment amount to the sum of the adjustment amounts with the length of the cycle-time, thereby obtaining each activation period for each end effecting device. With such a structure, proper actual activation time periods, each of which is proportional to the corresponding adjustment amount, are assigned to the end effecting devices.

The state control apparatus may further include an activation decider for generating information, which indicates whether or not each end effecting device should be activated, on the basis of the states measured by the meters. The activation decider and the calculator may be used alternatively. The parameter generator may generate a mode parameter indicating to use either the activation decider or the calculator, and may generate a limitation parameter corresponding to a limitation of time period for activating at least one of the end effecting devices in a cycle-time that is capable of being allocated for activating the end effecting devices sequentially when the activation decider is used. The comprehensive controller may allocate the cycle-time among activation periods for activating the end effecting devices on the basis of parameters including the limitation parameter when the activation decider is used. With such a structure, necessary end effecting devices can be activated while optional weighting factors are assigned to the end effecting devices to be activated.

In the state control apparatus, the parameter generator may generate a grouping parameter indicating a manner for grouping the end effecting devices when the end effecting devices are classified into a plurality of groups. When the comprehensive controller outputs one of the activating signals for activating one of the end effecting devices belonging to a group, the comprehensive controller may not output the other activating signals for activating the other end effecting devices belonging to the same group. Such grouping allows a plurality of optional end effecting devices belonging to different groups to be activated simultaneously. In addition, since a plurality of end effecting devices belonging to the same group are not activated simultaneously, the end effecting devices may be activated under restricted power consumption.

In the state control apparatus, the parameter generator may generate a prioritization parameter indicating a prioritization among the end effecting devices in each group. The comprehensive controller may adjust respective activations of the end effecting devices in each group on the basis of parameters including the prioritization parameter. With such a structure, a plurality of specific end effecting devices may be activated for longer periods preferentially. In addition, it is possible to cause the plurality of specific end effecting devices to enter a desirable state quickly. It is also possible to maintain the desirable state precisely for the plurality of specific end effecting device in comparison with the other end effecting devices.

In the state control apparatus, the comprehensive controller may differentiate an activating start moment of an end effecting device belonging to a group from that of another end effecting device belonging to another group. With such a structure, it is possible to prevent a plurality of end effecting devices belonging to different groups from starting to activate simultaneously although parallel processing is conducted by the "grouping." Therefore, a momentary upsurge of power consumption may be restrained.

In the state control apparatus, the comprehensive controller may delay a start moment of outputting the activating signal for an end effecting device. With such a structure, although the end effecting devices are activated and deactivated by relays or switches that may involve delays caused by mechanical motions, it is possible to prevent the activation periods of the end effecting devices from overlapping one another.

In another aspect of the present invention, a state control apparatus may include a calculator for calculating adjustment amounts for adjusting a plurality of end effecting devices on the basis of preset values and measured amounts measured by a plurality of meters. The measured amounts indicate respective states of the end effecting devices. The adjustment amounts are required for conforming the measured amounts to the preset values, respectively. The state control apparatus may further include a parameter generator for generating a prioritization parameter indicating a prioritization among the end effecting devices on the basis of settings by a user. The state control apparatus may further include a comprehensive controller for deciding which end effecting device to activate actually on the basis of the adjustment amounts and the prioritization parameter in the course of a cycle-time that is a reference time for activating the end effecting devices. When the comprehensive controller activates one of the end effecting devices, the comprehensive controller deactivates the other end effecting devices. With such a structure, the plurality of end effecting devices can be activated and controlled harmonically in accordance with a variety of parameters instructed by the user. Furthermore, since when an end effecting device is activated, the other end effecting devices are deactivated, the end effecting devices may be activated under restricted power consumption.

In the state control apparatus the comprehensive controller may activate the end effecting device having a higher priority indicated by the prioritization parameter and may deactivate the other end effecting devices when the adjustment amounts indicate a plurality of end effecting devices should be activated. With such a structure, a specific end effecting device may be activated for a longer period preferentially. It is possible to cause the specific end effecting device to enter a desirable state quickly. It is also possible to maintain the desirable state precisely for the specific end effecting device in comparison with the other end effecting devices.

BRIEF DESCRIPTION OF DRAWINGS

FIG. 5 is a table exemplifying parameters designated by a user of the state control apparatus of FIG. 3;

FIG. 6 is a time chart of an operation in a specific channel preferential mode of the state control apparatus in FIG. 3;

BEST MODE FOR CARRYING OUT THE INVENTION

In the following, with reference to accompanying drawings, a best mode for carrying out the present invention will be described for exemplifying the present invention.

Figure 1:
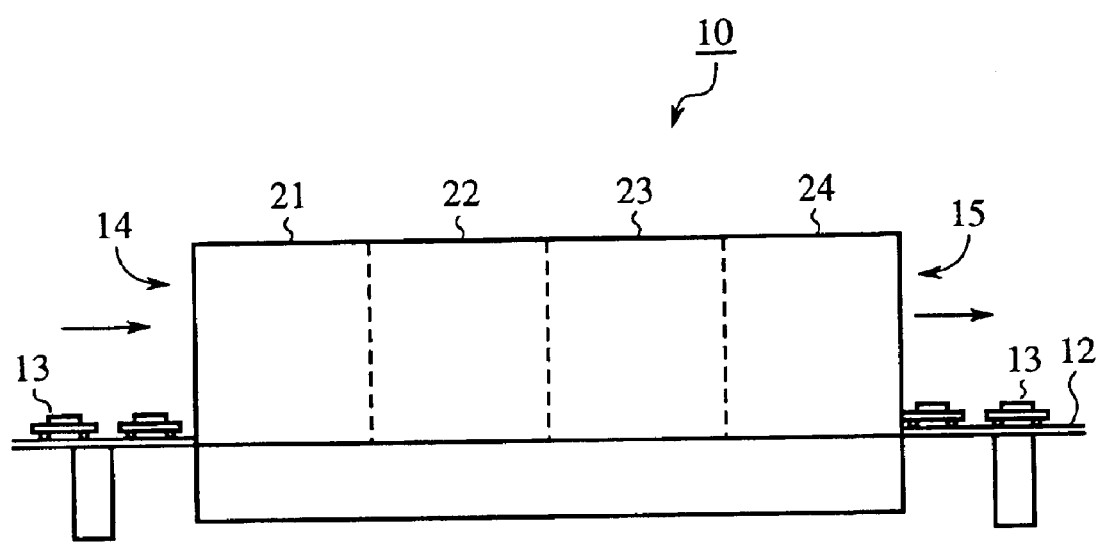
FIG. 1 is a side view of a furnace where a state control apparatus may be used.

A state control apparatus according to an embodiment of the present invention may be applied to, for example, a furnace 10 in FIG. 1. The furnace 10 contains a cavity extending along its longitudinal direction, along which a conveyor 12 is arranged so as to pass through the cavity. Heated subjects 13 transferred by the conveyor 12 enters at the entrance 14 of the furnace 10 and leaves the furnace 10 by the exit 15 while the heated subjects 13 are heated during passing through the furnace 10. The furnace 10 may be generally divided into four heated zones 21, 22, 23, and 24.

Figure 2:
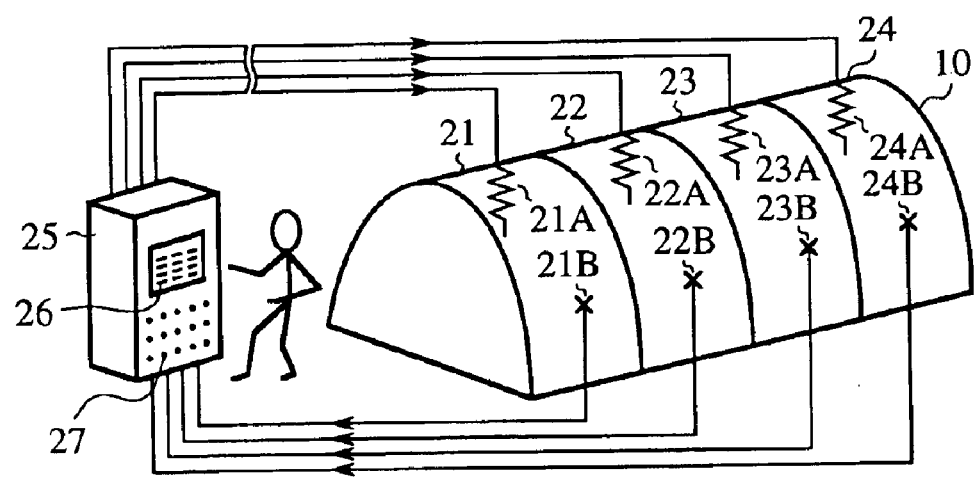
FIG. 2 is a perspective view of a state control apparatus according to an embodiment of the present invention.

As shown in FIG. 2, electric heaters (end effecting devices) 21A, 22A, 23A, and 24A are situated within the heated zones 21, 22, 23, and 24 of the furnace 10, respectively. Electric (e.g. thermocouple-type) thermometers 21B, 22B, 23B, and 24B are also situated within the heated zones 21, 22, 23, and 24, respectively, for measuring respective temperatures. Each of the thermometers (meters) 21B, 22B, 23B, and 24B supplies a signal of the temperature of corresponding zone 21, 22, 23, or 24 to a control board unit 25. In the following, the heated zones 21, 22, 23, and 24 will be sometimes referred to as channels CH1, CH2, CH3, and CH4, respectively.

Referring to the temperature signals, the control board unit 25 controls the plurality of heaters 21A, 22A, 23A, and 24A harmonically. However, it is not intended to limit the present invention to such a temperature control. Rather, the present invention may be applied to controls of moisture, pressure, or other suitable states. The control board unit 25 is provided with a man-machine interface utilized by a user for confirming parameters designated in the control board unit 25 and for renewing the parameters. The control board unit 25 comprises, as the man-machine interface, for example, a display panel 26 and an operation panel 27 including a plurality of manual operation buttons. However, the control board unit 25 may include a keyboard, a mouse, a pen-type input device, a voice recognition input device, or other suitable input device, instead of the operation panel 27.

Figure 3:
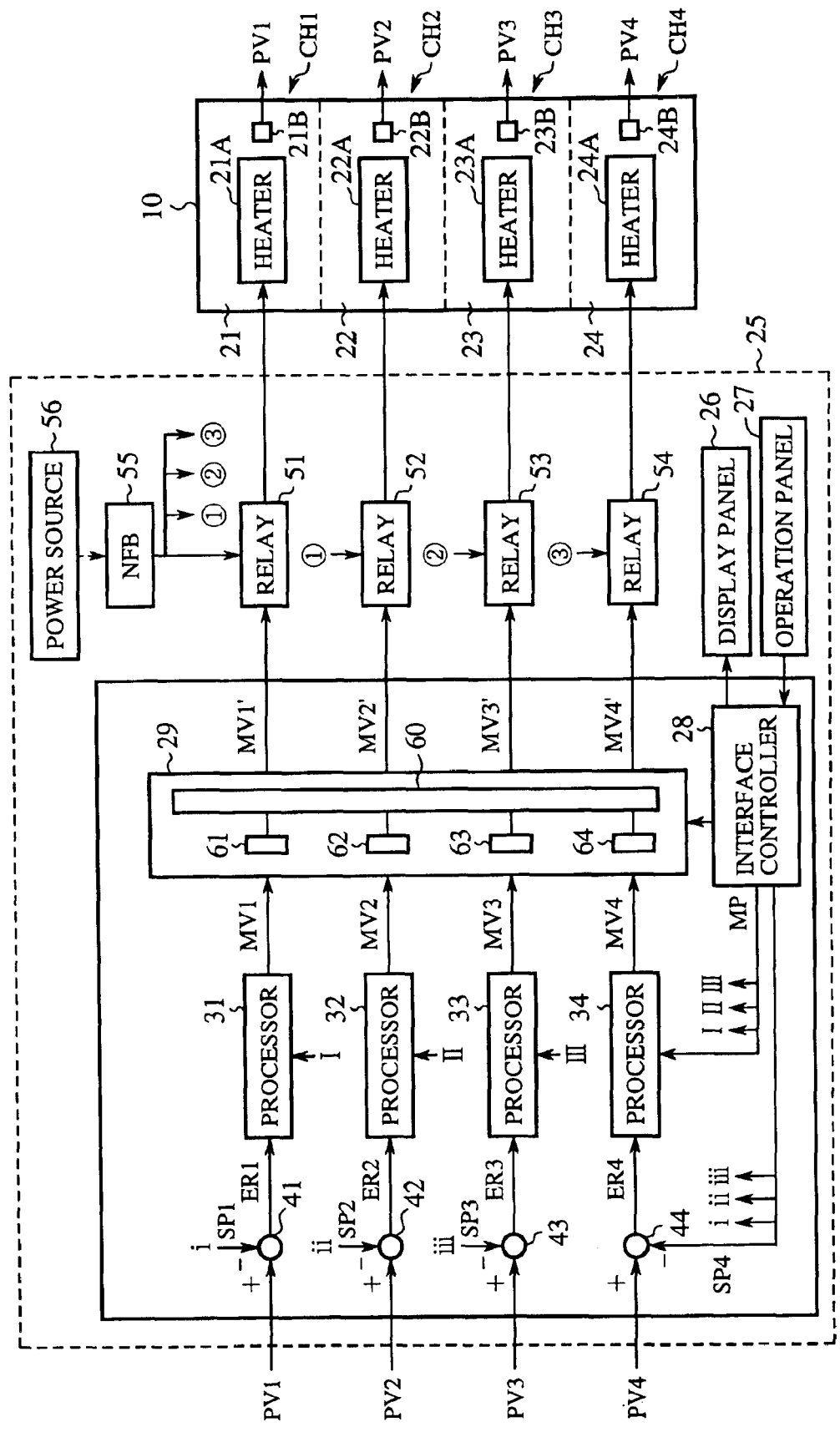
FIG. 3 is a block diagram of the state control apparatus of FIG. 2.

With reference to FIG. 3, the architecture of the state control apparatus according to the present invention will be described in more detail. The state control apparatus further comprises an interface controller (parameter generator) 28; a time-division controller 29; processors 31, 32, 33, and 34; and subtracters 41, 42, 43, and 44.

The interface controller 28 can operate on the basis of a parameter designating program and causes the display panel 26 to show screens for facilitating the user who inputs a plurality of parameter settings under the control of the parameter designating program. Under the guidance by the screens, the user manipulates the operation panel 27, thereby inputting desired parameter settings into the interface controller 28. Upon establishing all of desired parameter settings by finishing the input manipulation, the parameter designating program ends and the display panel 26 displays the established parameter settings (see FIG. 5).

In addition, upon establishing all of the desired parameter settings, the interface controller 28 generates a plurality of parameters on the basis of the user's designations. The parameters include target temperature parameters SP1, SP2, SP3, and SP4 of the heated zones 21, 22, 23, and 24; a mode parameter MP for altering the operational modes of the time-division controller 29 and the processors 31, 32, 33, and 34; and other various parameters, which will be described in detail. The target temperature parameters SP1, SP2, SP3, and SP4 are supplied to the subtracters 41, 42, 43, and 44, respectively. The mode parameter MP is supplied to the processors 31, 32, 33, and 34. The mode parameter MP and other various parameters are supplied to the time-division controller 29 that controls the heaters 21A, 22A, 23A, and 24A with reference to these parameters.

Relays 51, 52, 53, and 54 are interposed between the time-division controller 29 and the heaters 21A, 22A, 23A, and 24A. In this embodiment, the time-division controller 29 selectively activates and deactivates the relays 51, 52, 53, and 54, thereby controlling each period of activating each of the heaters 21A, 22A, 23A, and 24A. Consequently, by means of the relays 51, 52, 53, and 54, the time-division controller 29 can execute a time-division control of the heaters 21A, 22A, 23A, and 24A.

The relays 51 through 54 are connected with an NFB (non-fuse breaker) 55. The NFB 55 compulsorily cuts off the relays 51 through 54 for stopping the current flows from the power source 56 to the heaters 21A through 24A when the state control system is operated in overload.

In the state control apparatus, the thermometers 21B, 22B, 23B, and 24B give the subtracters 41, 42, 43, and 44 the measured temperature signals PV1, PV2, PV3, and PV4.

Each of the subtracter 41, 42, 43, and 44 subtracts the corresponding target temperature SP1, SP2, SP3, or SP4 from the corresponding measured temperature PV1, PV2, PV3, or PV4, thereby obtaining a deviation amount ER1, ER2, ER3, or ER4 and supplies it to the corresponding processor 31, 32, 33, or 34. Each of processors 31, 32, 33, and 34 calculates an adjustment amount MV1, MV2, MV3, or MV4 on the basis of the corresponding deviation amount ER1, ER2, ER3, or ER4, and supplies the corresponding adjustment amount MV1, MV2, MV3, or MV4 to the time-division controller 29. Each adjustment amount corresponds to an amount to be adjusted or controlled with respect to the respective end effecting device (heater) in order to accord a measured amount with a target amount (preset value).

The time-division controller 29 includes a main controller 60 and buffers 61, 62, 63, and 64. The adjustment amount MV1, MV2, MV3, and MV4 are temporarily stored in the buffers 61, 62, 63, and 64, respectively. On the basis of the adjustment amounts MV1, MV2, MV3, and MV4 and various parameters supplied from the interface controller 28, the main controller 60 generates activating signals MV1', MV2', MV3' and MV4' for activating the heaters 21A, 22A, 23A, and 24A actually, and then outputs them. The time-division controller 29 activates/deactivates the relays 51, 52, 53, and 54 in accordance with the actual activating signals MV1', MV2', MV3' and MV4', so as to perform the time-division control of the heaters 21A, 22A, 23A, and 24A.

As will be understood from the following description, available time-division control methods include an activation time calculation method wherein activation periods for heaters in one cycle are determined from the adjustment amounts, and a sequential output decision method wherein it is determined sequentially (at intervals of a very short cycle) as to whether each activation signal should be output or not on the basis of the adjustment amounts.

Figure 4:
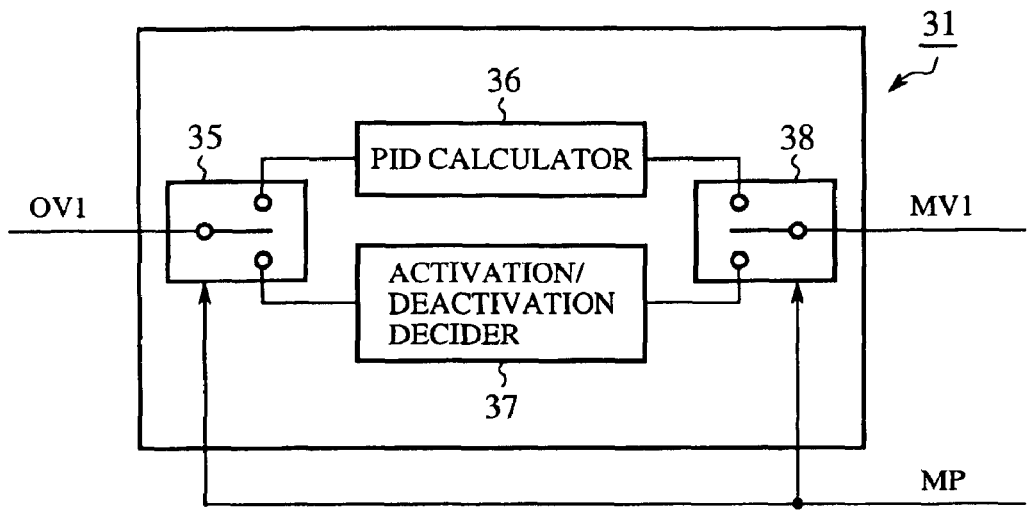
FIG. 4 is a diagram showing particulars of each processor in the state control apparatus of FIG. 3.

FIG. 4 shows particulars of the processor 31 in the state control apparatus. Each of the other processors 32, 33, and 34 also has the same architecture. The processor 31 includes a switch 35, a PID (proportional integral differential) calculator 36, an activation/deactivation decider 37, and another switch 38. Between the switches 35 and 38, the PID calculator 36 and the activation/deactivation decider (activation decider) 37 are arranged in parallel with each other. The switches 35 and 38 are controlled by the aforementioned mode parameter MP. More specifically, if the mode parameter MP is supplied which indicates that the PID calculator 36 should be selected, the switches 35 and 38 connect the PID calculator 36 with the subtracter 41 and the time-division controller 29. In this case, as mentioned above, the PID calculator 36 calculates the adjustment amount MV1 for the corresponding heater 21A on the basis of the deviation amount ER1 from the subtracter 41, and supplies the adjustment amount MV1 to the time-division controller 29.

Contrarily, if the supplied mode parameter MP indicates that the activation/deactivation decider 37 should be selected, the switches 35 and 38 connect the activation/deactivation decider 37 with the subtracter 41 and the time-division controller 29. In this case, the deviation amount ER1 is supplied from the subtracter 41 to the activation/deactivation decider 37. The activation/deactivation decider 37 compares the deviation amount ER1 with a threshold. More specifically, if the deviation amount ER1 is equal to or greater than the threshold, the activation/deactivation decider 37 outputs the adjustment amount MV1 set at 0% that means that the heater 21A should not be activated. However, if the deviation amount ER1 is less than the threshold, the activation/deactivation decider 37 provides the time-division controller 29 with the adjustment amount MV1 set at 100% that means that the heater 21A should be activated. The adjustment amount is temporarily stored in the buffer 61 of the time-division controller 29. On the basis of the adjustment amount MV1 and the parameters supplied to the time-division controller 29, the main controller 60 of the time-division controller 29 generates the activating signals MV1' for activating the heater 21A actually.

FIG. 5 exemplifies parameters designated by the user using with the operation panel 27. In FIG. 5, the "target temperature" parameters indicate respective target temperatures of the channels CH1 through CH4 (i.e. the heated zones 21 through 24).

Each "cycle-time" parameter indicates a cycle-time for the temperature control executed by the state control apparatus. The time-division controller 29 allocates the cycle-time among time periods for actually activating the heaters 21A through 24A sequentially.

The "grouping" parameter represents a manner selected by the user for grouping the controlled subjects, i.e., the heaters 21A through 24A when they are grouped by the user. In this embodiment, it is possible to selectively classify the channels into a plurality of groups, for example, one group including channels CH1 and CH2 while another group including channels CH3 and CH4. Each group may be controlled independently of another group. Optionally, a plurality of groups may be controlled synthetically. The grouping manner may be optionally selected by the user, and thus is not limited to the above-mentioned example. In addition, the user may optionally decide whether or not the "grouping" parameter is used.

The "deactivation-to-activation time lag" parameter is provided for the purpose of delaying activation of each heater. The "deactivation-to-activation time lag" parameter allows putting an interval between the deactivation moment of a heater and the activation moment of another heater. The user may optionally decide whether or not the "deactivation-to-activation time lag" parameter is used. If the "deactivation-to-activation time lag" parameter is not used, the user will input "0 sec" as the "deactivation-to-activation time lag" parameter.

The "output-restriction" parameters are provided for the purpose of restricting the adjustment amounts MV1, MV2, MV3, and MV4 calculated by the processors. Each "output-restriction" parameter corresponds to a limitation of time period for activating the corresponding heater in each cycle-time. On account of the application and the environment of the furnace 10 and other factors, the user may optionally decide whether or not the "output-restriction" parameters are used. If the "output-restriction" parameters are not used, the user will input "100%" as the "output-restriction" parameters. However, it may be contemplated that the use of the "output-restriction" parameters are frequently indispensable because of characteristics of the heaters, control characteristics of the furnace 10, and other factors. Although the exemplified "output-restriction" parameters are maximum time periods in the embodiment, it is possible to use other "output-restriction" parameters for selecting the minimum time periods for activating heaters in each cycle-time.

The "mode" parameter indicates the current operational mode of the state control apparatus. It is mandatory for the user to designate the "mode" parameter.

The "time allocation" parameters can be optionally used only when the control apparatus is in the modes where the activation/deactivation deciders 37 should be selected within the processors. Each "time allocation" parameter indicates a desired time period throughout which each of the heaters 21A through 24A of the channels CH1 through CH4 should be heated actually in each cycle-time. Upon receiving from the respective activation/deactivation deciders 37 the signal instructing to heat the corresponding channel CH1, CH2, CH3, or CH4, the time-division controller 29 calculates the time period for actually activating the corresponding heater 21A, 22A, 23A, or 24A in accordance with the "time allocation" parameter.

The "interchannel activation time lag" parameter can be optionally used only when the aforementioned "grouping" parameter is set to be used. The "interchannel activation time lag" parameter is provided for the purpose of differentiating the activation start moment of a heater belonging to a group from that of another heater belonging to another group, and thus indicates the time lag between the activation start moments of the heaters.

Within the parameters illustrated in FIG. 5, the "target temperature" parameters are reported to subtracters 41 through 44 by the target temperature signals SP1, SP2, SP3, and SP4 shown in FIG. 3 as described above, but are not reported to the time-division controller 29. The other parameters illustrated in FIG. 5 are supplied to the time-division controller 29. The "mode" parameter is further provided to all processors 31 through 34 as described above. Particulars of these parameters will be clarified by the description below.

Next, an operation in specific channel preferential mode of the temperature control apparatus will be explained. The specific channel preferential mode corresponds to mode A in FIG. 5. In the specific channel preferential mode, heaters of lower-numbered channels within the channels CH1 through CH4 are prioritized. That is the heater 21A has top priority and the heater 22A has the second while the heater 23A has the third. When the specific channel preferential mode is selected, the interface controller 28 generates a prioritization parameter defining the order of precedence among the heaters 21A through 24A, and supplies the prioritization parameter to the time-division controller 29. In addition, the interface controller 28 generates a mode parameter MP indicating that the PID calculator 36 should be selected within each of the processors 31 through 34, and supplies the mode parameter MP to the processors 31 through 34.

With reference to the time chart in FIG. 6, an example of operation in the specific channel preferential mode will be described. The example of FIG. 6 is based on parameter settings (see FIG. 5) wherein the "cycle-time" is 10 seconds, the "grouping" is "nonuse", the "deactivation-to-activation time lag" is null (0 seconds), the "output-restriction" parameters are null (100%) for all channels, and the "mode" is mode A (specific channel preferential mode).

Let us assume that before cycle-time CA in FIG. 6, the PID calculator 36 in the processor 31 has calculated the adjustment amount MV1 at 30% for the heater 21A per cycle-time CA while the PID calculator 36 in the processor 32 has calculated the adjustment amount MV2 at 20% for the heater 22A. Furthermore, let us assume that the adjustment amount MV3 is calculated at 20% for the heater 23A while the adjustment amount MV4 is calculated at 10% for the heater 24A. In the specific channel preferential mode, the adjustment amount MV1, MV2, MV3, and MV4 correspond to time periods throughout which the respective heaters 21A, 21B, 21C, and 21D are activated in a cycle-time. Accordingly, it is preferable that in one cycle-time each heater is activated for a time period that is the product of the corresponding adjustment amount and the cycle time. However, the time-division controller 29 may adjust each activation time period for each heater in accordance with parameters.

First, the main controller 60 of the time-division controller 29 calculates the actual activation time period for the overriding heater 21A at 3 seconds, which is the product of 10 seconds (one cycle-time) and 30% (MV1). This corresponds to the output period for the activating signal MV1' in FIG. 6.

Next, the main controller 60 calculates the actual activation time period (output period for the activating signal MV2') for the heater 22A with the secondary priority at 2 seconds, which is the product of 10 seconds (one cycle-time) and 20% (MV2). The main controller 60 calculates the actual activation time period (output period for the activating signal MV3') for the third heater 23A at 2 seconds, which is the product of 10 seconds (one cycle-time) and 20% (MV3). The main controller 60 calculates the actual activation time period (output period for the activating signal MV4') for the last heater 24A at 1 second, which is the product of 10 seconds (one cycle-time) and 10% MV4). The main controller 60 allocates one cycle-time (10 seconds) among the actual activation time periods thus obtained in such a manner that the periods do not overlap with one another.

Next, let us assume that before cycle-time CB, the processors 31 through 34 have calculated the adjustment amount MV1 at 50% for heater 21A, the adjustment amount MV2 at 40% for heater 22A, the adjustment amount MV3 at 20% for heater 23A, and the adjustment amount MV4 at 20% for heater 24A per cycle-time CB.

In this case, the main controller 60 allots 5 seconds to the actual activation time period (output period for the activating signal MV1') for the overriding heater 21A since the product of 10 seconds (one cycle-time) and 50% (MV1) is 5 seconds. Next, the main controller 60 allots 4 seconds to the actual activation time period (output period for the activating signal MV2') for the heater 22A with the secondary priority since the product of 10 seconds (one cycle-time) and 40% (MV2) is 4 seconds. The main controller 60 calculates the actual activation time period (output period for the activating signal MV3') for the third heater 23A at 2 seconds according to the adjustment amount MV3 (20%). However, since the remaining period is only 1 second (one cycle-time is 10 seconds), the main controller 60 allots the available time period, i.e., 1 second to the actual activation time period (output period for the activating signal MV3') for the third heater 23A. Additionally, since all the cycle-time has been exhausted, the main controller 60 allots zero periods to the actual activation time period (output period for the activating signal MV4') for the last heater 24A.

Furthermore, let us assume that before cycle-time CC, the processors 31 through 34 have calculated the adjustment amount MV1 at 1000% for the heater 21A, the adjustment amount MV2 at 40% for the heater 22A, the adjustment amount MV3 at 20% for the heater 23A, and the adjustment amount MV4 at 5% for the heater 24A per cycle-time CC.

In this case, the main controller 60 allots 10 seconds to the actual activation time period (output period for the activating signal MV1') for the overriding heater 21A since 100% (MV1) of 10 seconds (one cycle-time) is 10 seconds. Then, cycle-time CC has no margin for activating the other heaters 22A, 23A, and 24A. Thus, the main controller 60 allots zero seconds to the actual activation time periods (output periods for the activating signals MV2', MV3', and MV4') for the heaters 22A through 24A.

Since the temperature control apparatus can allot one cycle-time (10 seconds) among the actual activation time periods (output periods for the activating signals MV1' through MV4') such that the periods do not overlap with one another, the apparatus can activate and control the respective heaters harmonically under restricted power consumption.

In addition, in the specific channel preferential mode, one or more specific heaters of preceding channels may be activated for longer periods preferentially. It is possible to realize a desirable state quickly in some environment, for example, an environment where quicker heating is desired only for one or more specific heated subjects (any of heated zones 21 through 24). It is also possible to maintain a desirable state precisely in some environment, for example, an environment where one or more specific heated subjects should be maintained more precisely.

Next, with reference to FIG. 7, another example of operation in the specific channel preferential mode will be described. In this example, an output-restriction is given to each of the heaters 21A through 24A in accordance with the aforementioned "output-restriction" parameters. As described above, the "output-restriction" parameters are provided for the purpose of restricting to output the adjustment amounts MV1, MV2, MV3, and MV4 calculated by the processors. Each "output-restriction" parameter corresponds to a limitation of time period for activating the corresponding heater in each cycle-time. Although any of processors 31 through 34 calculates a large adjustment amount for allocating a long activation period to any of heaters, the actual activation time period is restricted by the corresponding "output-restriction" parameter.

On the contrary, it is possible to use other "output-restriction" parameters for selecting the minimum time periods for activating heaters in each cycle-time. In this case, although any of processors 31 through 34 calculates a small adjustment amount, the actual activation time period is prolonged by the corresponding "output-restriction" parameter, thereby ensuring a minimum necessary activation period.

Figure 7:
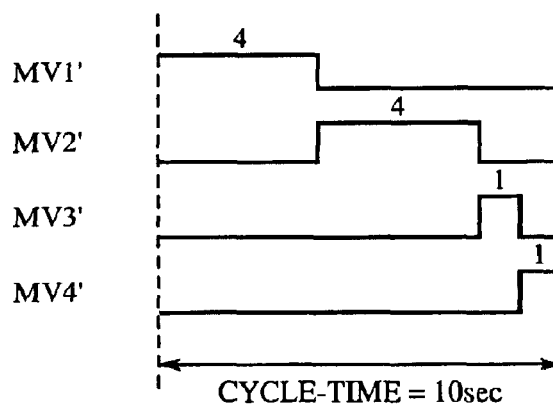
FIG. 7 is a time chart of an operation in the specific channel preferential mode of the state control apparatus in FIG. 3 when output restrictions are given to end effecting devices.

The example of FIG. 7 is based on parameter settings (see FIG. 5) wherein the "cycle-time" is 10 seconds, the "grouping" is "nonuse", the "deactivation-to-activation time lag" is null (0 seconds), the "output-restriction" parameters are 40% for all channels, and the "mode" is mode A (specific channel preferential mode). Under the settings of "output-restriction" parameters, each of the heaters 21A through 24A should not be activated for a period longer than 4 seconds that is 40% (output-restriction) of the 10 seconds (cycle-time) per one cycle-time.

Let us assume that before the cycle-time in FIG. 7, the PID calculator 36 in the processor 31 has calculated the adjustment amount MV1 at 100% for the heater 21A per cycle-time while the PID calculator 36 in the processor 32 has calculated the adjustment amount MV2 at 80% for the heater 22A. Furthermore, let us assume that the adjustment amount MV3 is calculated at 10% for the heater 23A while the adjustment amount MV4 is calculated at 10% for the heater 24A.

First, the main controller 60 of the time-division controller 29 calculates the actual activation time period (output period for the activating signal MV1') for the overriding heater 21A at 10 seconds, which is the product of 10 seconds (one cycle-time) and 100% (MV1). However, since 10 seconds are longer than the 4 seconds (the maximum value defined as the output-restriction), the main controller 60 discards the calculation result and allots 4 seconds to the actual activation time period for the heater 21A. The main controller 60 calculates the actual activation time period (output period for the activating signal MV2') for the heater 22A with the secondary priority at 8 seconds, which is 80% (MV2) of the product of 10 seconds (one cycle-time). Since 8 seconds are also longer than the 4 seconds (the maximum value), the main controller 60 discards the calculation result and also allots 4 seconds to the actual activation time period for the heater 22A. The main controller 60 allots 1 second to the actual activation time period (output period for the activating signal MV3') for the third heater 23A since the product of 10 seconds (one cycle-time) and 10% (MV3) is 1 second, which is shorter than the "output-restriction" parameter (40%). The main controller 60 also allots 1 second to the actual activation time period (output period for the activating signal MV4') for the last heater 24A since the product of 10 seconds (one cycle-time) and 10% (MV3) is 1 second.

Thus, in the specific channel preferential mode, one or more specific heaters of preceding channels may be activated for longer periods preferentially. Furthermore, by virtue of the use of the "output-restriction" parameters, the periods for activating the other heaters may be ensured in accordance with application, environment, property, and other factors.

Next, with reference to FIG. 8, another example of operation in the specific channel preferential mode will be described. In this example, the aforementioned "deactivation-to-activation time lag" parameters are utilized. As described above, the "deactivation-to-activation time lag" parameter is provided for the purpose of delaying activation of each heater. The example of FIG. 8 is based on parameter settings (see FIG. 5) wherein the "cycle-time" is 10 seconds, the "grouping" is "nonuse", the "deactivation-to-activation time lag" is 0.5 seconds, the "output-restriction" parameters are null (100%) for all channels, and the "mode" is mode A (specific channel preferential mode).

Figure 8:
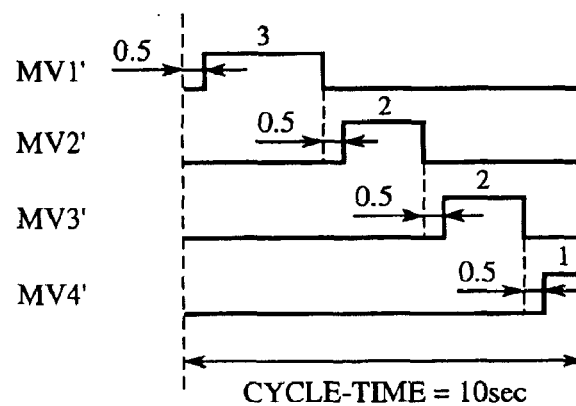
FIG. 8 is a time chart of an operation in the specific channel preferential mode of the state control apparatus in FIG. 3 when a "deactivation-to-activation time lag" parameter is established.

Let us assume that before the cycle-time in FIG. 8, the PID calculator 36 in the processor 31 has calculated the adjustment amount MV1 at 30% for the heater 21A per cycle-time while the PID calculator 36 in the processor 32 has calculated the adjustment amount MV2 at 20% for the heater 22A. Furthermore, let us assume that the adjustment amount MV3 is calculated at 20% for the heater 23A while the adjustment amount MV4 is calculated at 10% for the heater 24A.

First, the main controller 60 of the time-division controller 29 calculates the actual activation time period for the overriding heater 21A at 3 seconds, which is the product of 10 seconds (one cycle-time) and 30% (MV1). This corresponds to the output period for the activating signal MV1' in FIG. 6. Next, the main controller 60 calculates the actual activation time period (output period for the activating signal MV2') for the heater 22A with the secondary priority at 2 seconds, which is the product of 10 seconds (one cycle-time) and 20% (MV2). The main controller 60 calculates the actual activation time period (output period for the activating signal MV3') for the third heater 23A at 2 seconds, which is the product of 10 seconds (one cycle-time) and 20% (MV3). The main controller 60 calculates the actual activation time period (output period for the activating signal MV4') for the last heater 24A at 1 second, which is the product of 10 seconds (one cycle-time) and 10% (MV4).

The main controller 60 puts an interval, which corresponds to "deactivation-to-activation time lag" (0.5 seconds), between the beginning of the cycle-time and the output start moment of the activating signal MV1'. The main controller 60 also puts an interval, which corresponds to "deactivation-to-activation time lag" (0.5 seconds), between the output termination moment (tailing edge) of the activating signal MV1' and the output start moment (leading edge) of the next activating signal MV2'. The main controller 60 further puts intervals of the same length between the output termination moment of the activating signal MV2' and the output start moment of the next activating signal MV3', and between the output termination moment of the activating signal MV3' and the output start moment of the next activating signal MV4'.

Figure 9:
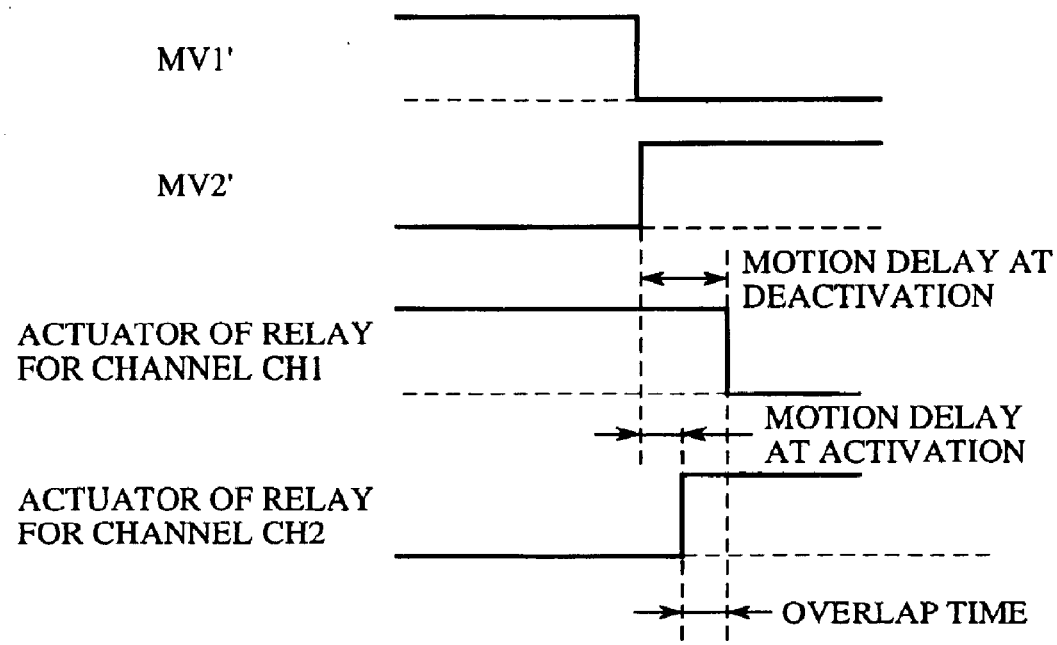
FIGS. 9 and 10 are time charts illustrating a merit of the operation in FIG. 8.
Figure 10:
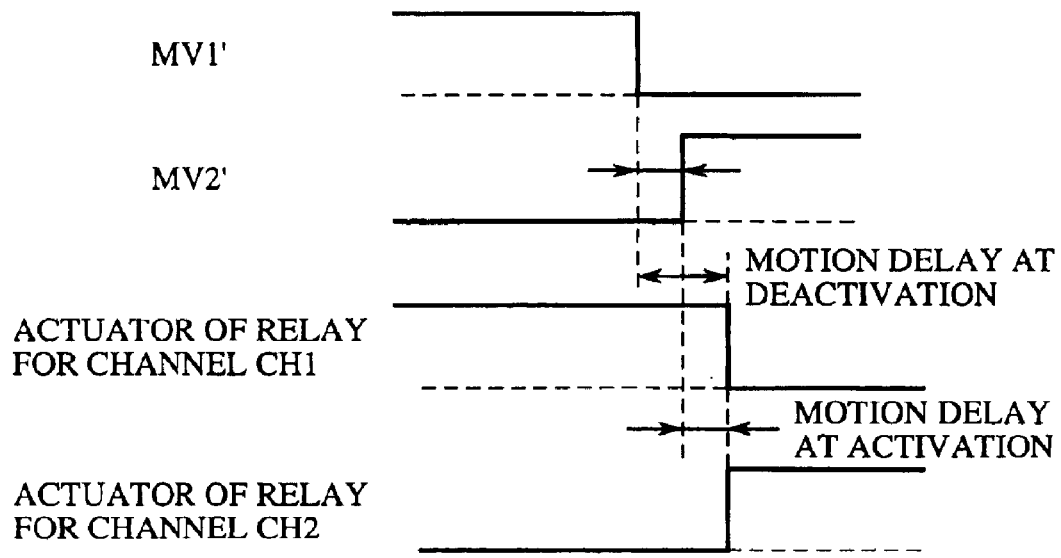

A merit in the "deactivation-to-activation time lag" will be described with reference to FIGS. 9 and 10. FIG. 9 illustrates the condition where the "deactivation-to-activation time lag" is not used, whereby the activation period of the heater 22A (output of the activating signal MV2') starts immediately after the termination of the activation period of the heater 21A (output termination of the activating signal MV1'). Although the time-division controller 29 decides the output periods for the activating signals MV1' and MV2' in the above manner, the actual start and termination of activation of heaters may sometimes lag in comparison with the expectations as illustrated in FIG. 9. One reason for time lag is the relays 51 through 54 are frequently electromechanical relays including actuators. Because of delay in mechanical motion of actuators, the tailing edge of the activation period of the heater 21A actually overlaps the leading edge of the activation period of the heater 22A, thereby increasing power consumption temporarily.

On the contrary, when the "deactivation-to-activation time lag" is put appropriately, the heater 22A starts to be activated simultaneously with or after the tailing edge of the activation period of the heater 21A, thereby preventing power consumption from increasing abruptly although the mechanical motion of relays cause a delay.

In the specific channel preferential mode, the "deactivation-to-activation time lag" parameter may be concomitantly used with the "output-restriction" parameters.

Next, with reference to FIG. 11, an activation-period calculation routine executed by the main controller 60 in the specific channel preferential mode will be described. In this routine, at step ST1, the main controller 60 determines whether or not the present moment is the moment to calculate actual activation time periods for heaters, referring to its built-in timer. If the determination is affirmative, the main controller 60 retrieves at step ST2 from the buffers 61 through 64 the adjustment amounts MV1 through MV4, which the processors 31 through 34 have calculated. At step ST3, the main controller 60 calculates activation periods LMV1' through LMV4' (output periods for the activating signals MV1' through MV4') (sec.) by multiplying the adjustment amounts MV1 through MV4 by the length of cycle-time.

At step ST4, it is determined whether or not the activation period LMV1' for the heater 21A is in excess of the maximum time period TLMX1 (sec.). The maximum time period TLMX1, which is the allowable maximum time period for activating the heater 21A in one cycle-time, is determined by multiplying the length of cycle-time by the "output-restriction" parameter for the channel CH1. If the determination is affirmative, the main controller 60 cuts the activation period LMV1' down to the maximum time period TLMX1 at step ST5.

Then, at step ST6, it is determined whether or not the activation period LMV2' for the heater 22A is in excess of the maximum time period TLMX2 (sec.). The maximum time period TMLX2, which is the allowable maximum time period for activating the heater 22A in one cycle-time, is determined by multiplying the length of cycle-time by the "output-restriction" parameter for the channel CH2. If the determination is affirmative, the main controller 60 cuts the activation period LMV2' down to the maximum time period TLMX2 at step ST7.

Similarly, by means of steps ST8 and ST9, if the activation period LMV3' for the heater 23A is in excess of the maximum time period TLMX3 (sec.), the main controller 60 cuts the activation period LMV3' down to the maximum time period TMLX3. By steps ST10 and ST11, if the activation period LMV4' for the heater 24A is in excess of the maximum time period TMLX4 (sec.), the main controller 60 cuts the activation period LMV4' down to the maximum time period TLMX4.

Then, at step ST12, a calculation is made in accordance with the following formula.

$$\Sigma LMV' = LMV1' + LMV2' + LMV3' + LMV4' + \Sigma SINT$$

where SINT is an interval corresponding to the "deactivation-to-activation time lag" and ΣSINT is the sum of the intervals SINT. For example, in the case of the time chart in FIG. 8, SINT is 0.5 seconds while ΣSINT is 2 seconds as being quadruple of SINT. Consequently, ΣLMV' is a total time required for activating all the heaters 21A through 24A sequentially.

At step ST13, the main controller 60 determines whether or not ΣLMV' is in excess of the length of cycle-time CT. If the determination is negative, the main controller 60 temporarily stores the values LMV1' through LMV4' in the buffers 61 through 64 at step ST28 since it is no longer necessary to adjust the values LMV1' through LMV4'. However, if the determination is affirmative at step ST13, one or more activation periods should be adjusted. In this routine, the activation period for the heater 24A with the lowest priority is shortened first. If the time reduction for the heater 24A is insufficient for the adjustment of the total activation time, the time reduction process progresses to the heater 23A with the secondarily lowest priority, then, to the heater 22A with the secondarily highest priority, and finally to the heater 21A with the highest priority.

In the time reduction process, at step ST14, the main controller 60 determines whether or not flag F4, which will be described later, has been set. If the determination is negative, the routine proceeds to step ST15 where the main controller 60 decrements (or shortens by a constant) the value LMV4'. Next, it is determined whether or not the value LMV4' is zero at step ST16. If the determination is negative, the routine returns to step ST12 where the main controller 60 calculates the total activation time ΣLMV' again, using the shortened value LMV4'. Then, at step ST13, the recalculated total activation time ΣLMV' is compared with the length of the cycle-time CT. Thus, the decrement of the value LMV4' may be repeated until the total activation time ΣLMV' becomes equal to or less than the cycle-time CT.

When the decrement results in that the LMV4' reaches zero, the determination is affirmative at step ST16, and then the main controller 60 sets flag F4 at step ST17. Flag F4 means that the value LMV4' is zero and thus cannot be decremented. Furthermore, at step ST18, the main controller 60 subtracts an interval length SIT from the interval sum ΣSINT since one interval no longer exists between the activation periods LMV3' and LMV4' by clearing away the activation period LMV4' for the heater 24A for the channel CH4 (see FIG. 8).

Next, the routine returns to step ST12 where the main controller 60 calculates the total activation time ΣLMV' again, using the shortened value ΣSINT. Then, at step ST13, the recalculated total activation time ΣLMV' is compared with the length of the cycle-time CT. If the determination is still affirmative at step ST13, the routine proceeds to step ST14. However, since flag F4 has been set (step ST17), the determination at step ST14 is affirmative, so that the routine proceeds to step ST19.

At step ST19, the main controller 60 determines whether or not flag F3, which will be described later, has been set. If the determination is negative, the routine proceeds to step ST20 where the value LMV3' is decremented. Next, it is determined whether or not the value LMV3' is zero at step ST21. If the determination is negative, the routine returns to step ST12 where the main controller 60 calculates the total activation time ΣLMV' again, using the shortened value LMV3'. Then, at step ST13, the recalculated total activation time ΣLMV' is compared with the length of the cycle-time CT. Thus, the decrement of the value LMV3' may be repeated until the total activation time ΣLMV' becomes equal to or less than the cycle-time CT.

When the decrement results in that the LMV3' reaches zero, the determination is affirmative at step ST21, and then the main controller 60 sets flag F3 at step ST22. Flag F3 means that the value LMV3' is zero and thus cannot be decremented. Furthermore, at step ST18, the main controller 60 subtracts an interval length SIT from the interval sum ΣSINT since one interval no longer exists between the activation periods LMV2' and LMV3' by clearing away the activation period LMV3' for the heater 23A co the channel CH3 (see FIG. 8).

Next, the routine returns to step ST12 where the main controller 60 calculates the total activation time ΣLMV' again, using the shortened value ΣSINT. Then, at step ST13, the recalculated total activation time ΣLMV' is compared with the length of the cycle-time CT. If the determination is still affirmative at step ST13, the routine proceeds through steps ST14 and ST19 to step ST23.

At step ST23, the main controller 60 determines whether or not flag F2, which will be described later, has been set. If the determination is negative, the routine proceeds to step ST24 where the value LMV2' is decremented. Next, it is determined whether or not the value LMV2' is zero at step ST25. If the determination is affirmative, the routine returns to step ST12 where the main controller 60 calculates the total activation time ΣLMV' again, using the shortened value LMV2'. Then, at step ST13, the recalculated total activation time ΣLMV' is compared with the length of the cycle-time CT. Thus, the decrement of the value LMV2' may be repeated until the total activation time ΣLMV' becomes equal to or less than the cycle-time CT.

When the decrement results in that the LMV2' reaches zero, the determination is affirmative at step ST25, and then the main controller 60 sets flag F2 at step ST26. Flag F2 means that the value LMV2' is zero and thus cannot be decremented. Furthermore, at step ST18, the main controller 60 subtracts an interval length SIT from the interval sum ΣSINT since one interval no longer exists between the activation periods LMV1' and LMV2' by clearing away the activation period LMV2' for the heater 22A for the channel CH2 (see FIG. 8).

Next, the routine returns to step ST12 where the main controller 60 calculates the total activation time ΣLMV' again, using the shortened value ΣSINT. Then, at step ST13, the recalculated total activation time ΣLMV' is compared with the length of the cycle-time CT. If the determination is still affirmative at step ST13, the routine proceeds through steps ST14, ST19 and ST23 to step ST27. At step ST 27, the main controller 60 decrements the value LMV', and then the routine returns to step ST12. Thus, the decrement of the value LMV1' (now being equal to ΣLMV') may be repeated until the total activation time ΣLMV' becomes equal to or less than the cycle-time CT.

The actual activation time period parameters LMV1' through LMV4' thus established are stored temporarily at buffers 61 through 64 by the main controller 60 at step ST28. Then, the main controller 60 resets flags F2 through F4, which are no longer necessary, at step ST29, and initializes the value ΣSINT at step ST30. For example, in the case of the time chart in FIG. 8, the initial value of ΣSINT is 2 seconds as being quadruple of SINT. After the completion of step ST30, the routine returns to step ST1 for determining again whether or not the present moment is the moment to calculate activation periods. As described above, in the specific channel preferential mode, the actual activation time periods LMV1' through LMV4' are determined in accordance with the "deactivation-to-activation time lag" parameter and the "output-restriction" parameters.

Next, with reference to FIG. 12, an activating routine executed by the main controller 60 in the specific channel preferential mode will be described. This activating routine is executed for activating the respective heaters 21A through 24A.

In this routine, at step ST31, the main controller 60 determines whether or not the present moment is the beginning moment of a cycle-time, referring to its built-in timer. If the determination is affirmative, the main controller 60 initializes the heaters 21A through 24A of all channels CH1 through CH4 at step ST32.

Next, at step ST33, the main controller 60 determines whether or not an "activation condition" is satisfied in connection with the heater 21A of the channel CH1. Herein, the "activation condition" is that the corresponding calculated activation period (e.g., LMV1') for activating the heater (e.g., 21A) is greater than zero. If the determination is negative, the routine proceeds to step ST38. If the determination is affirmative, the routine proceeds to step ST34 for waiting for the passing of the "deactivation-to-activation time lag" (interval SINT). Then, at step ST35, the main controller 60 activates the relay 51 for the channel CH1 and deactivates the relays 52 through 54 for the other channels, thereby starting to activate the heater 21A only.

Once the activation period LMV1' for the heater 21A for the channel CH1 expires (step ST36), the main controller 60 resets the value LMV1' stored in the buffer 61 at step ST37, and then the routine returns to step ST32 for initializing the heaters 21A through 24A for all the channels CH1 through CH4. Since the activation period LMV1' has already expired, the determination at step ST33 is in turn negative, so that the routine proceeds to step ST38 for deactivating the channel CH1.

Next, at step ST39, the main controller 60 determines whether or not the "activation condition" is satisfied in connection with the heater 22A of the channel CH2. If the determination is negative, the routine proceeds to step ST44. If the determination is affirmative, the routine proceeds to step ST40 for waiting for the passing of the "deactivation-to-activation time lag" (interval SINT). Then, at step ST41, the main controller 60 activates the relay 52 for the channel CH2 and deactivates the relays 53 and 54 for the other channels, thereby starting to activate the heater 22A only.

Once the activation period LMV2' for the heater 22A for the channel CH2 expires (step ST42), the main controller 60 resets the value LMV2' stored in the buffer 62 at step ST42, and then the routine returns to step ST32 for initializing the heaters 21A through 24A for all the channels CH1 through CH4. Since the activation periods LMV1' and LMV2' have already expired, the determinations at steps ST33 and ST39 are in turn negative, so that the routine proceeds to step ST44 for deactivating the channel CH2.

Next, at step ST45, the main controller 60 determines whether or not the "activation condition" is satisfied in connection with the heater 23A of the channel CH3. If the determination is negative, the routine proceeds to step ST50. If the determination is affirmative, the routine proceeds to step ST46 for waiting for the passing of the "deactivation-to-activation time lag" (interval SINT). Then, at step ST47, the main controller 60 activates the relay 53 for the channel CH3 and deactivates the relay 54 for the other channel, thereby starting to activate the heater 23A only.

Once the activation period LMV3' for the heater 23A for the channel CH3 expires (step ST47), the main controller 60 resets the value LMV3' stored in the buffer 63 at step ST49, and then the routine returns to step ST32 for initializing the heaters 21A through 24A for all the channels CH1 through CH4. Since the activation periods LMV1' through LMV3' have already expired, the routine proceeds through steps ST33, ST38, ST39, ST44 and ST45 to step ST50 for deactivating the channel CH3.

Next, at step ST51, the main controller 60 determines whether or not the "activation condition" is satisfied in connection with the heater 24A of the channel CH4. If the determination is negative, the routine returns to step ST31 for determining again whether or not the present moment is the beginning moment of the next cycle-time. If the determination is affirmative, the routine proceeds to step ST52 for waiting for the passing of the "deactivation-to-activation time lag" interval SINT). Then, at step ST53, the main controller 60 activates the relay 54 for the channel CH4, thereby starting to activate the heater 24A only.

Once the activation period LMV4' for the heater 24A for the channel CH4 expires (step ST54), the main controller 60 resets the value LMV4' stored in the buffer 64 at step ST55, and then the routine returns to step ST31 for determining again whether or not the present moment is the beginning moment of the next cycle-time.

As described above, in the specific channel preferential mode, the harmonic activation of heaters are realized using the "deactivation-to-activation time lag" parameter and the "output-restriction" parameters. In accordance with the activating routine illustrated in the flowchart of FIG. 12, any channel is not activated until the expiration of activation period for a preceding channel expires, and if any, the "deactivation-to-activation time lag." Therefore, when the activation periods are determined, it is unnecessary to determine the commencement moment and termination moment of each of the activation periods LMV1' through LMV4', so that one cycle-time can be readily allocated among the activation periods LMV1' through LMV4'.

In the illustrated embodiment of the specific channel preferential mode, heaters of lower-numbered channels within the channels CH1 through CH4 are prioritized. However, it is contemplated that the user can decide the order of precedence among channels in an alternative embodiment.

In the illustrated embodiment, the same "deactivation-to-activation time lag" parameter is commonly allocated to all channels. However, it is contemplated that the user can decide different "deactivation-to-activation time lag" parameters for respective channels in an alternative embodiment.

In the illustrated embodiment, the "output-restriction" parameter is the maximum limit of activation periods. However, it is contemplated that the minimum limit of activation periods may further be used.

Next, an operation of required-adjustment amount proportion mode in the temperature control apparatus will be described.

The required-adjustment amount proportion mode corresponds to mode B in FIG. 5. In the required-adjustment amount proportion mode, no priority is assigned to any channels, i.e., all channels are treated equally. If the sum of the adjustment amounts MV1 through MV4 calculated by the PID calculators 36 of the processors 31 through 34 is in excess of 100% (corresponding to the length of one cycle-time), the respective activation periods for respective channels are equally shortened. Therefore, actual activation time periods proportional to the corresponding adjustment amounts MV1 through MV4 are allocated to respective channels. If the required-adjustment amount proportion mode is chosen, the interface controller 28 produces a "mode" parameter corresponding to this mode, and supplies the "mode" parameter to the time-division controller 29. In addition, the interface controller 28 generates a mode parameter MP indicating that the PID calculators 36 of the processors 31 through 34 should be selected, and supplies the mode parameter MP to the processors 31 through 34.

With reference to the time chart in FIG. 13, an example of operation in the required-adjustment amount proportion mode will be described. The example of FIG. 13 is based on parameter settings (see FIG. 5) wherein the "cycle-time" is 10 seconds, the "grouping" is "nonuse", the "deactivation-to-activation time lag" is null (0 seconds), the "output-restriction" parameters are null (100%) for all channels, and the "mode" is mode B (required-adjustment amount proportion mode).

Figure 13:
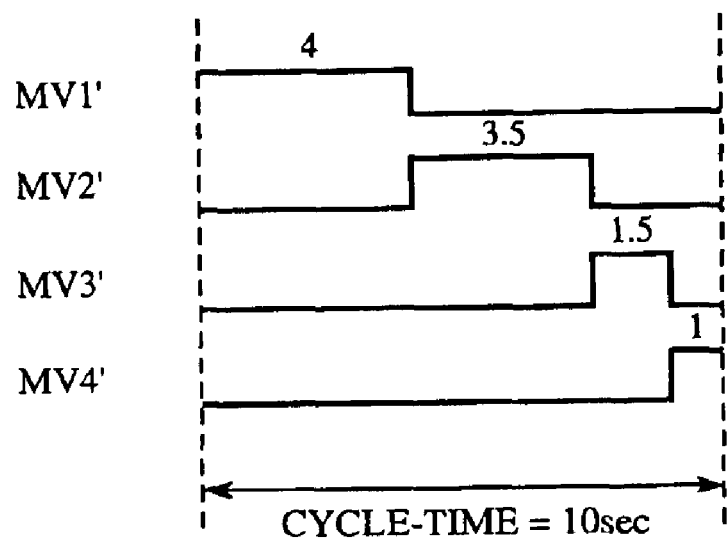
FIG. 13 is a time chart of an operation in a required-adjustment amount proportion mode of the state control apparatus in FIG. 3.

Let us assume that before the cycle-time in FIG. 13, the PID calculator 36 in the processor 31 has calculated the adjustment amount MV1 at 80% for the heater 21A per cycle-time while the PID calculator 36 in the processor 32 has calculated the adjustment amount MV2 at 70% for the heater 22A. Furthermore, let us assume that the adjustment amount MV3 is calculated at 30% for the heater 23A while the adjustment amount MV4 is calculated at 20% for the heater 24A.

The main controller 60 of the time-division controller 29 calculates the sum $\Sigma MV$ (%) of the adjustment amounts MV1 through MV4 (%) in connection with the heaters 21A through 24A for all channels CH1 through CH4. Then, the main controller 60 divides each adjustment amount by the adjustment amount sum $\Sigma MV$, and multiplies each quotient by the length of one cycle-time CT (sec.), thereby obtaining each actual activation time period. That is to say, the actual activation time periods LMV1' through LMV4' may be obtained by the following formulae.

$$LMV1'=CT*MV1/\Sigma MV$$

$$LMV2'=CT*MV2/\Sigma MV$$

$$LMV3'=CT*MV3/\Sigma MV$$

$$LMV4'=CT*MV4/\Sigma MV$$

More specifically, LMV1'=10*80/(80+70+30+20)=4 seconds. LMV2'=3.5 seconds while LMV3'=1.5 seconds, and LMV4'=1 second. The main controller 60 allocates one cycle-time (10 seconds) among the actual activation time periods thus obtained in such a manner that the periods do not overlap with one another.

In the required-adjustment amount proportion mode, since the temperature control apparatus allots one cycle-time (10 seconds) among the actual activation time periods LMV1' through LMV4' such that the periods do not overlap with one another, the apparatus can activate and control the respective heaters harmonically under restricted power consumption. Furthermore, since the allotted actual activation time periods are proportional to the adjustment amounts required for the respective heaters, all the heaters may, e.g., enter the steady state substantially simultaneously. In the required-adjustment amount proportion mode, the "deactivation-to-activation time lag" parameter and the "output-restriction" parameters may be utilized.

Figure 14:
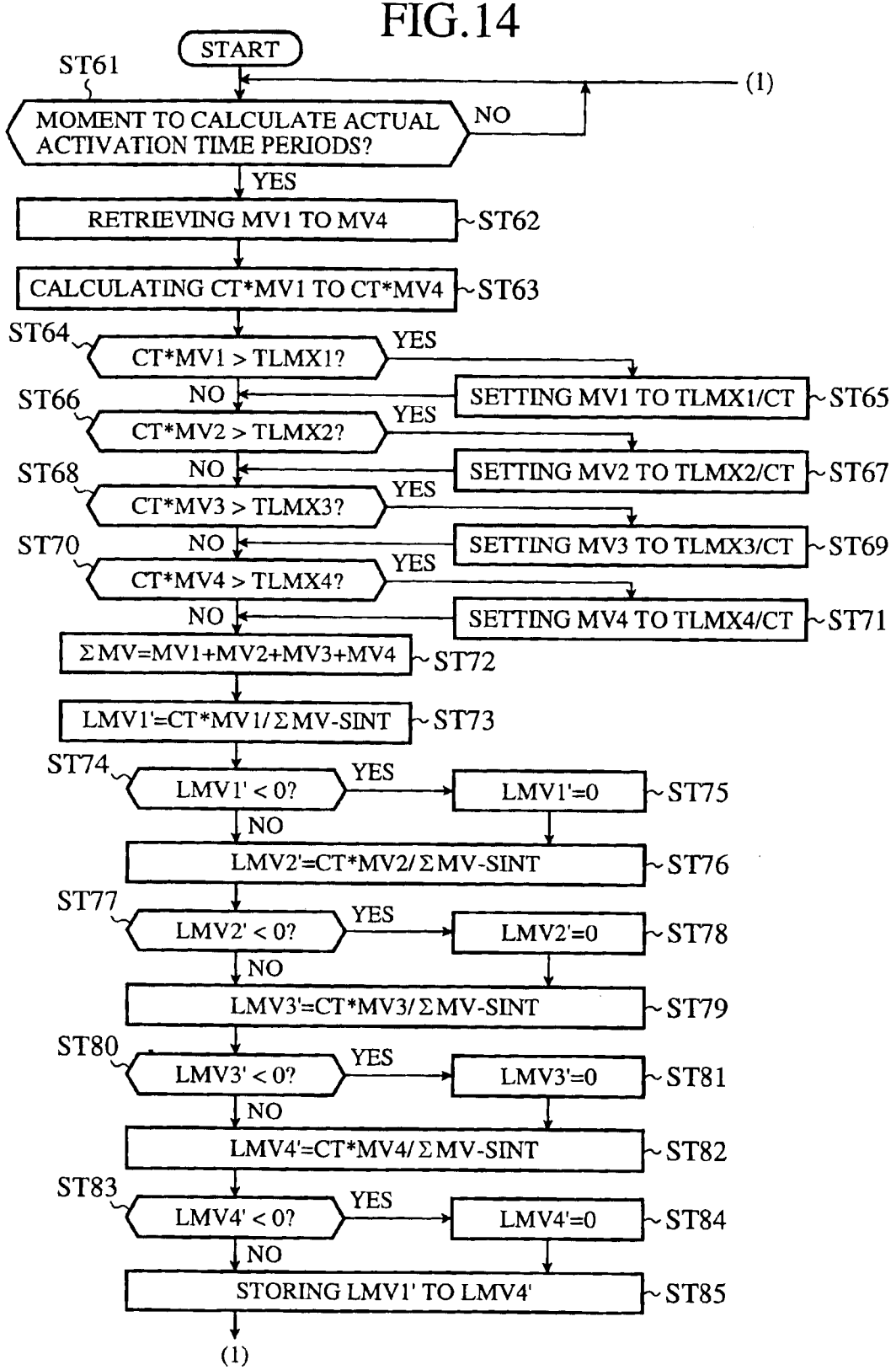
FIG. 14 is a flow chart illustrating an activation-period calculation routine for achieving the required-adjustment amount proportion mode shown in FIG. 13.

With reference to FIG. 14, an activation-period calculation routine executed by the time-division controller 29 in the aforementioned required-adjustment amount proportion mode will be described. In this routine, at step ST61, the main controller 60 determines whether or not the present moment is the moment to calculate actual activation time periods LMV1' through LMV4' for heaters, referring to its built-in timer. If the determination is affirmative, the main controller 60 retrieves at step ST62 from the buffers 61 through 64 the adjustment amounts MV1 through MV4, which the processors 31 through 34 have calculated. At step ST63, the main controller 60 multiplies each of the other adjustment amounts MV1 through MV4 by the length of cycle-time CT.

Next, at step ST64, the main controller 60 determines whether or not CT*MV1 is in excess of the maximum time period TLMX1 (sec.). The maximum time period TLMX1 is determined by multiplying the "output-restriction" parameter for the channel CH1 by the length of cycle-time CT. If the determination is affirmative, the main controller 60 cuts down the adjustment amount MV1 to TMLX1/CT, i.e., the "output-restriction" parameter at step ST65.

At step ST66, the main controller 60 determines whether or not CT*MV2 is in excess of the maximum time period TLMX2 (sec.). If the determination is affirmative, the main controller 60 cuts down the adjustment amount MV2 to TMLX2/CT, i.e., the "output-restriction" parameter for the channel CH2 at step ST67.

Similarly, by means of steps ST68 and ST69, if CT*MV3 is in excess of the maximum time period TLMX3 (sec.), the adjustment amount MV3 is cut down to TMLX3/CT, i.e., the "output-restriction" parameter for the channel CH3. By means of steps ST70 and ST71, if CT*MV4 is in excess of the maximum time period TMLX4 (sec.), the adjustment amount MV4 is cut down to TLMX4/CT, i.e., the "output-restriction" parameter for the channel CH4.

Then, at step ST72, a calculation is made in accordance with the following formula.

$$\Sigma MV = MV1 + MV2 + MV3 + MV4$$

As described above, ΣMV is the sum of all the adjustment amounts MV1 through MV4 (%).

Then, the routine proceeds to step ST73, ST76, ST79, and ST82 for calculating the actual activation time periods LMV1' through LMV4' (sec.) by the following formulae.

$$LMV1' = CT*MV1/\Sigma MV - SINT$$

$$LMV2' = CT*MV2/\Sigma MV - SINT$$

$$LMV3' = CT*MV3/\Sigma MV - SINT$$

$$LMV4' = CT*MV4/\Sigma MV - SINT$$

where SINT is an interval corresponding to the "deactivation-to-activation time lag" parameter. If the "deactivation-to-activation time lag" parameter is not used, SINT that is the second term of each formula is zero.

However, by subtracting the interval SINT, it is possible that any of the resulting values LMV1' through LMV4' is less than zero. In such a case, decision is made at any of steps ST74, ST77, ST80, and ST83, so that the routine proceeds to any of steps ST75, ST78, ST81, and ST84 for setting the corresponding value (any of LMV1' through LMV4') to zero.

The actual activation time period parameters LMV1' through LMV4' thus established are stored temporarily at buffers 61 through 64 by the main controller 60 at step ST85. After the completion of step ST85, the routine returns to step ST61 for determining again whether or not the present moment is the moment to calculate activation periods.

As described above, in the required-adjustment amount proportion mode, the actual activation time periods LMV1' through LMV4' are determined in accordance with the "deactivation-to-activation time lag" parameter and the "output-restriction" parameters.

In this mode, the main controller 60 of the time-division controller 29 uses the same activating routine as that used in the aforementioned specific channel preferential mode. In other words, the activating routine described with reference to FIG. 12 may be also used in the required-adjustment amount proportion mode.

Next, an operation in combination mode wherein the specific channel preferential mode and the required-adjustment amount proportion mode of the temperature control apparatus will be described.

The combination mode corresponds to mode C in FIG. 5. In the combination mode, at least one specific channel is preferentially treated while the other channels are treated equally. For example, the heater 21A is preferentially treated, so as to enjoy benefit of the actual activation time period LMV1' directly based on the adjustment amount MV1 calculated by the PID calculator 36 of the processor 31 (irrespective of whether or not the sum of the adjustment amounts MV1 through MV4 obtained by the PID calculator 36 of the processors 31 through 34 is in excess to 100%). On the other hand, the other heaters 22A, 23A, 24A are treated equally, so that the remaining period in the cycle-time is allocated among the activation periods LMV2' through LMV4'. If the sum of the adjustment amounts MV2 through MV4 is in excess of an amount corresponding to the remaining period, the activation periods for channels CH2 through CH4 are shortened equally. Therefore, actual activation time periods being proportional to the corresponding adjustment amounts MV2 through MV4 are allocated to the respective channels CH2 through CH4. If the combination mode is chosen, the interface controller 28 produces a "mode" parameter corresponding to this mode, and supplies the "mode" parameter to the time-division controller 29. In addition, the interface controller 28 generates a mode parameter MP indicating that the PID calculators 36 of the processors 31 through 34 should be selected, and supplies the mode parameter MP to the processors 31 through 34.

With reference to the time chart in FIG. 15, an example of operation in the combination mode will be described. The example of FIG. 15 is based on parameter settings (see FIG. 5) wherein the "cycle-time" is 10 seconds, the "grouping" is "nonuse", the "deactivation-to-activation time lag" is null (0 seconds), the "output-restriction" parameters are null (100%) for all channels, and the "mode" is mode C (combination mode).

Figure 15:
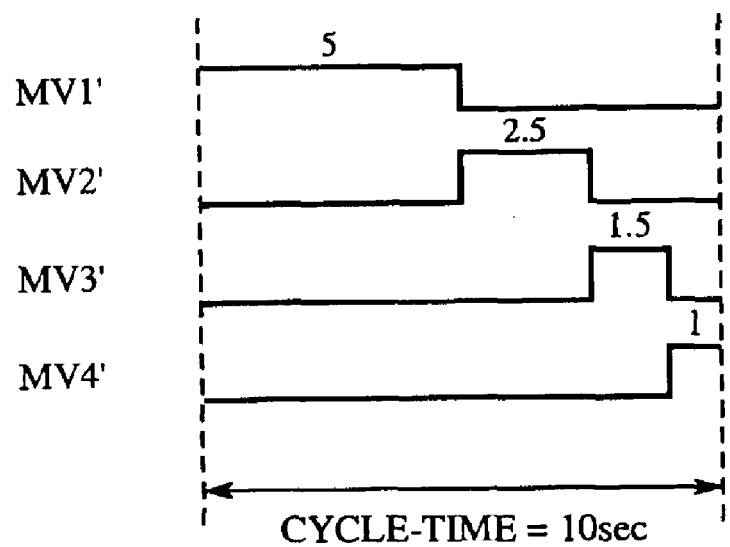
FIG. 15 is a time chart of an operation in a combination mode of the state control apparatus in FIG. 3.

Let us assume that before the cycle-time in FIG. 15, the PID calculator 36 in the processor 31 has calculated the adjustment amount MV1 at 50% for the heater 21A per cycle-time while the PID calculator 36 in the processor 32 has calculated the adjustment amount MV2 at 50% for the heater 22A. Furthermore, let us assume that the adjustment amount MV3 is calculated at 30% for the heater 23A while the adjustment amount MV4 is calculated at 20% for the heater 24A.

The main controller 60 first allocates 5 seconds to the actual activation time period LMV1' (output period for the activating signal MV1') for the heater 21A since the product of 10 seconds (one cycle-time) and 50% (MV1) is 5 seconds. Then, if no good deal is used, only the second heater 22A can be activated insofar as the remaining period (5 seconds).

However, in the combination mode, the main controller 60 of the time-division controller 29 calculates the sum ΣSMV (%) of the adjustment amounts MV2 through MV4 (%) for the heaters 22A through 24A of the secondary channels CH2 through CH4. Then, the main controller 60 divides each adjustment amount by the adjustment amount sum ΣSMV, and multiplies each quotient by the length of remaining period (sec.), thereby obtaining each actual activation time period. That is to say, the actual activation time periods LMV2' through LMV4' may be obtained by the following formulae.

$$LMV2'=(CT-LMV1')*MV2/\Sigma SMV$$

$$LMV3'=(CT-LMV1')*MV3/\Sigma SMV$$

$$LMV4'=(CT-LMV1')*MV4/\Sigma SMV$$

More specifically, LMV1'=CT*MV1=10*0.5=5 seconds. LMV2'=(10−5)*50/(50+30+20)=2.5 seconds while LMV3'= 1.5 seconds and LMV4'=1 second. The main controller 60 allocates one cycle-time (10 seconds) among the actual activation time periods thus obtained in such a manner that the periods do not overlap with one another.

In the combination mode, one or more overriding channels can gain the benefit of the specific channel preferential mode, the secondary channels may obtain the merit of the required-adjustment amount proportion mode.

More specifically, one or more specific heaters of preceding channels may be activated for longer periods preferentially. It is possible to realize a desirable state quickly in some environment, for example, an environment where quicker heating is desired only for one or more specific heated subjects (any of heated zones 21 through 24). It is also possible to maintain a desirable state precisely in some environment, for example, an environment where one or more specific heated subjects should be maintained more precisely.

In connection with the secondary channels, since activation periods less than the desired adjustment amounts are allotted to the respective secondary heaters, response to temperature is not excellent. However, since the temperature control apparatus allots one cycle-time (10 seconds) among the actual activation time periods LMV1' through LMV4' such that the periods do not overlap with one another, the apparatus can activate and control the respective heaters harmonically under restricted power consumption. Furthermore, since the allotted actual activation time periods are proportional to the adjustment amounts required for the corresponding secondary heaters, all the secondary heaters may, e.g., enter the steady state substantially simultaneously.

Even in the combination mode, the "deactivation-to-activation time lag" parameter and the "output-restriction" parameters may also be utilized.

Figure 16:
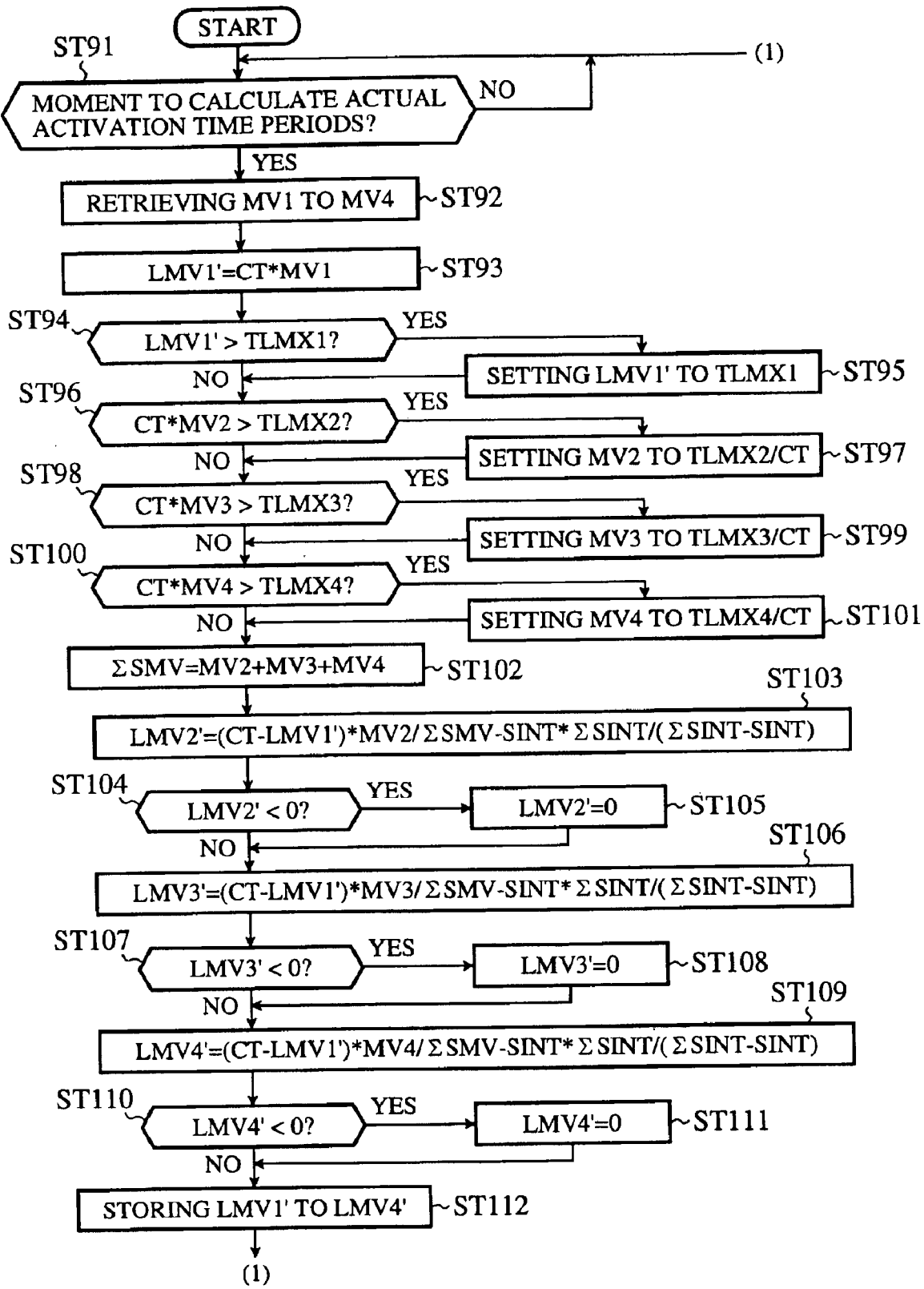
FIG. 16 is a flow chart illustrating an activation-period calculation routine for achieving the combination mode shown in FIG. 15.

With reference to FIG. 16, an activation-period calculation routine executed by the main controller 60 of the time-division controller 29 in the aforementioned combination mode will be described. In this routine, at step ST91, the main controller 60 determines whether or not the present moment is the moment to calculate actual activation time periods LMV1' through LMV4' for heaters, referring to its built-in timer. If the determination is affirmative, the main controller 60 retrieves at step ST92 from the buffers 61 through 64 the adjustment amounts MV1 through MV4, which the processors 31 through 34 have calculated. At step ST93, the main controller 60 calculates the activation period LMV1' by multiplying the adjustment amount MV1 by the length of cycle-time. In addition, the main controller 60 multiplies each of the other adjustment amounts MV2 through MV4 by the length of cycle-time CT.

Next, at step ST94, the main controller 60 determines whether or not the value LMV1' is in excess of the maximum time period TLMX1 (sec.). The maximum time period TLMX1 is determined by multiplying the "output-restriction" parameter of the channel CH1 by the length of cycle-time. If the determination is affirmative, the main controller 60 cuts down the activation period LMV1' to TLMX1 at step ST95.

At step ST96, the main controller 60 determines whether or not CT*MV2 is in excess of the maximum time period TLMX2 (sec.). If the determination is affirmative, the main controller 60 cuts down the adjustment amount MV2 to TMLX2/CT at step ST97.

Similarly, by means of steps ST98 and ST99, if CT*MV3 is in excess of the maximum time period TLMX3 (sec.), the adjustment amount MV3 is cut down to TMLX3/CT, i.e., the "output-restriction" parameter for the channel CH3. By means of steps ST100 and ST101, if CT*MV4 is in excess of the maximum time period TMLX4 (sec.), the adjustment amount MV4 is cut down to TLMX4/CT, i.e., the "output-restriction" parameter for the channel CH4.

Next, at step ST102, a calculation is made in accordance with the following formula.

$$\Sigma SMV=MV2+MV3+MV4$$

where ΣSMV is the sum (%) of the adjustment amounts for all the secondary heaters 22A through 24A.

Then, the routine proceeds to steps ST103, ST106, and ST109 for calculating the activation periods LMV1' through LMV4' (sec.) by the following formulae.

$$LMV2'=(CT-LMV1')*MV2/\Sigma SMV-SINT*\Sigma SINT/(\Sigma SINT-SINT)$$

$$LMV3'=(CT-LMV1')*MV3/\Sigma SMV-SINT*\Sigma SINT/(\Sigma SINT-SINT)$$

$$LMV4'=(CT-LMV1')*MV4/\Sigma SMV-SINT*\Sigma SINT/(\Sigma SINT-SINT)$$

where SINT is an interval corresponding to the "deactivation-to-activation time lag" while ΣSINT is the sum of such intervals. The second term of each formula is greater than that of those formula used at steps ST73, ST76, ST79, ST82 in FIG. 14 since the overriding heater 21A gains the calculated actual activation time period LMV1' without subtracting the interval SINT. If the "deactivation-to-activation time lag" parameter is not used, SINT that is the second term of each formula is zero.

However, by subtracting the interval SINT, it is possible that any of the resulting values LMV2' through LMV4' is less than zero. In such a case, decision is made at any of steps ST104, ST107, and ST110, so that the routine proceeds to any of steps ST105, ST108, and ST111 for setting the corresponding value (any of LMV2' through LMV4') to zero.

The actual activation time period parameters LMV1' through LMV4' thus established are stored temporarily at buffers 61 through 64 by the main controller 60 at step ST112. After the completion of step ST112, the routine returns to step ST91 for determining again whether or not the present moment is the moment to calculate activation periods.

As described above, in the combination mode, the actual activation time periods LMV1' through LMV4' are determined in accordance with the "deactivation-to-activation time lag" parameter and the "output-restriction" parameters.

In this mode, the main controller 60 of the time-division controller 29 uses the same activating routine as that used in the aforementioned specific channel preferential mode. In other words, the activating routine described with reference to FIG. 12 may be also used in the combination mode.

Furthermore, an operation in time allocation mode of the temperature control apparatus will be described.

The time allocation mode corresponds to mode D in FIG. 5. In the time allocation mode, the activation/deactivation decider 37 (see FIG. 4) is selected to be used in each of processors 31 through 34. As described above, each activation/deactivation decider 37 provides the time-division controller 29 with the corresponding adjustment amount (e.g., MV1) indicating 100% when the corresponding heater should be activated. Otherwise, each activation/deactivation decider 37 provides the time-division controller 29 with the adjustment amount (e.g., MV1) indicating 0%.

The "time allocation" parameters shown in FIG. 5 can be set and used only when the time allocation mode is selected. Each "time allocation" parameter corresponds to a desired time period throughout which each of the heaters 21A through 24A of the channels CH1 through CH4 should be heated actually in each cycle-time. Upon receiving from the respective activation/deactivation deciders 37 the signal instructing to heat the corresponding channel CH1, CH2, CH3, or CH4, the time-division controller 29 calculates the time periods for actually activating the corresponding heaters 21A, 22A, 23A, or 24A in accordance with the "time allocation" parameter.

If the time allocation mode is chosen, the interface controller 28 produces a "time allocation" parameter on the basis of the user's settings, and supplies the "time allocation" parameter to the time-division controller 29. In addition, the interface controller 28 generates a mode parameter MP indicating that the activation/deactivation deciders 37 of the processors 31 through 34 should be selected, and supplies the mode parameter MP to the processors 31 through 34.

Figure 17:
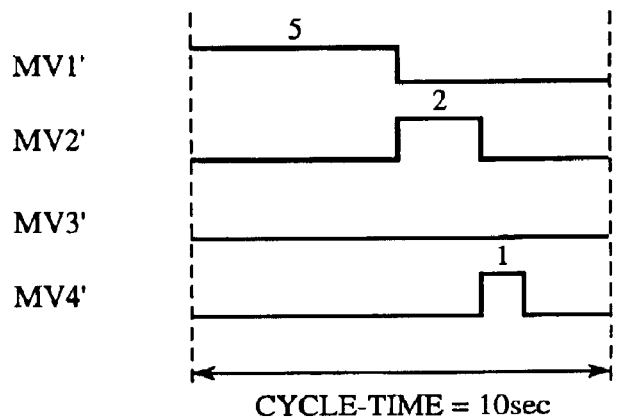
FIG. 17 is a time chart of an operation in a time allocation mode of the state control apparatus in FIG. 3.

With reference to the time chart in FIG. 17, an example of operation wherein the time allocation mode is utilized will be described. The example of FIG. 17 is based on parameter settings (see FIG. 5) wherein the "cycle-time" is 10 seconds, the "grouping" is "nonuse", the "deactivation-to-activation time lag" is null (0 seconds), the "output-restriction" parameters are null (100%) for all channels, and the "mode" is mode D (time allocation mode). The "time allocation" parameter for the heater 21 of the channel 1 is 50%, the "time allocation" parameter for the heater 22 of the channel 2 is 20%, that for the heater 23 of the channel 3 is 20%, and that for the heater 24 of the channel 4 is 10%.

Let us assume that before the cycle-time in FIG. 17, the activation/deactivation deciders 37 in the processors 31, 32, and 34 have output the adjustment amounts MV1, MV2, and MV4 at 100% for the heaters 21A, 22A, and 24A, respectively per cycle-time while the activation/deactivation decider 37 in the processor 33 has output the adjustment amount MV3 at 0% for the heater 23A.

The main controller 60 of the time-division controller 29 first retrieves the adjustment amounts MV1 through MV4 from the buffers 61 through 64. Then, the main controller 60 calculates the actual activation time period (output period for the activating signal MV1') for the heater 21A, which should be heated, at 5 seconds, which is the product of 10 seconds (one cycle-time) and 50% (MV1). Similarly, the main controller 60 calculates the activation period LMV2' for the heater 22A at 2 seconds, and the activation period LMV4' for the heater 24A at 1 second. In addition, the main controller 60 fixes the activation period LMV3' at zero seconds for the heater 23A indicated not to be heated by the adjustment amount MV3.

The main controller 60 allocates one cycle-time (10 seconds) among the actual activation time periods LMV1' through LMV4' thus obtained in such a manner that the periods do not overlap with one another. For example, the activating routine illustrated in the flow chart of FIG. 12, whereby one cycle-time may be readily allocated among the activation periods LMV1' through LMV4'.

In accordance with the time allocation mode, necessary heaters can be heated while optional weighting factors ("time allocation" parameter) are assigned to the heaters to be heated. Accordingly, heaters of specific channels are preferentially activated for longer periods in order to heat them more quickly or maintain the temperatures thereof more precisely. Alternatively, all the heaters may enter the steady state substantially simultaneously.

In the time allocation mode, the "time allocation" parameters are set for the respective channels. However, it is possible to use the "output-restriction" parameters instead of the "time allocation" parameters.

Furthermore, an operation using the "grouping" parameter in the temperature control apparatus will be described.

As described above, the "grouping" parameter represents a selection manner for grouping the controlled subjects, i.e., the heaters 21A through 24A when they should be grouped. When the "grouping" parameter is set, the main controller 60 of the time-division controller 29 may control each group independently of another group.

Figure 18:
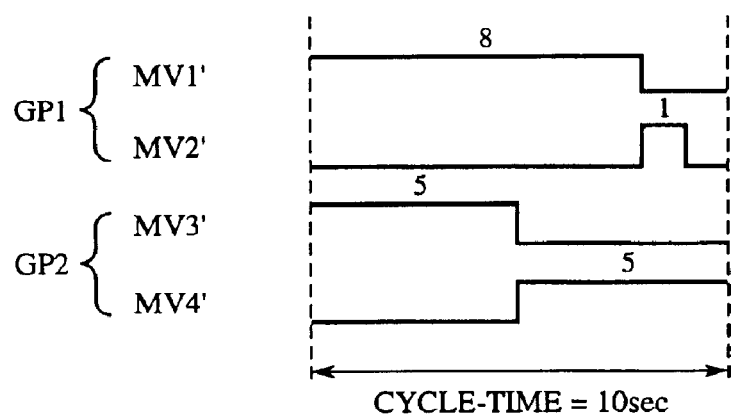
FIG. 18 is a time chart of an operation of the state control apparatus in FIG. 3 when a "grouping" parameter is utilized.

With reference to the time chart in FIG. 18, an example of operation using the "grouping" parameter will be described. The example of FIG. 18 is based on parameter settings (see FIG. 5) wherein the "cycle-time" is 10 seconds, the "grouping" is "use", "group GP1" includes channels CH1 and CH2, "group GP2" includes channels CH3 and CH4, the "deactivation-to-activation time lag" is null (0 seconds), the "output-restriction" parameters are null (100%) for all channels, and the "mode" is mode A (specific channel preferential mode). In this case, by virtue of setting the specific channel preferential mode, channel CH1 is preferential in group GP1 and channel CH3 is preferential in group GP2.

Let us assume that before the cycle-time in FIG. 18, the PID calculator 36 in the processor 31 has calculated the adjustment amount MV1 at 80% for the heater 21A per cycle-time while the PID calculator 36 in the processor 32 has calculated the adjustment amount MV2 at 10% for the heater 22A. Furthermore, let us assume that the adjustment amount MV3 is calculated at 50% for the heater 23A while the adjustment amount MV4 is calculated at 80% for the heater 24A.

Concerning group GP1, the main controller 60 of the time-division controller 29 calculates the actual activation time period LMV1' for the overriding heater 21A at 8 seconds, which is the product of 10 seconds (one cycle-time) and 80% (MV1). Then, the main controller 60 calculates the actual activation time period LMV2' for the remaining heater 22A at 1 second, which is the product of 10 seconds (one cycle-time) and 10% (MV2). The main controller 60 allocates one cycle-time (10 seconds) among the actual activation time periods LMV1' and LMV2' thus obtained in such a manner that the periods do not overlap with each other.

Concerning group GP2, the main controller 60 of the time-division controller 29 calculates the actual activation time period LMV3' for the overriding heater 23A at 5 seconds, which is the product of 10 seconds (one cycle-time) and 50% (MV3). Then, the main controller 60 calculates the actual activation time period LMV4' for the remaining heater 24A at 7 second, which is the product of 10 seconds (one cycle-time) and 70% (MV4). However, the main controller 60 cuts down the activation time period LMV4' to 5 seconds since the cycle-time has the margin of 5 seconds only. The main controller 60 allocates one cycle-time (10 seconds) among the actual activation time periods LMV3' and LMV4' thus obtained in such a manner that the periods do not overlap with each other.

Consequently, using the "grouping" parameter allows a kind of parallel processing with regard to the groups (groups GP1 and GP2 in the above example). The grouping results in that power consumption increases twice or more times in comparison with the case where grouping is not used, but is smaller than that in the case where individual heaters are activated independently. Furthermore, in the specific channel preferential mode, the grouping allows a plurality of heaters belonging to specific channels may be preferentially activated for longer periods. For example, it is possible to realize a desirable state quickly in some environment, for example, an environment where quicker heating is desired only for specific heated subjects (e.g., heated zones 21 and 23). It is also possible to maintain a desirable state precisely in some environment, for example, an environment where specific heated subjects should be maintained more precisely.

Furthermore, an operation using the "interchannel activation time lag" parameter as well as the "grouping" parameter in the temperature control apparatus will be described. As described above, the "interchannel activation time lag" parameter can be optionally used only when the aforementioned "grouping" parameter is set to be used. The "interchannel activation time lag" parameter is provided for the purpose of differentiating the activation start moment of a heater belonging to a group (e.g., GP1) from that of another heater belonging to another group (e.g., GP1), and indicates the time lag between the activation start moments.

Figure 19:
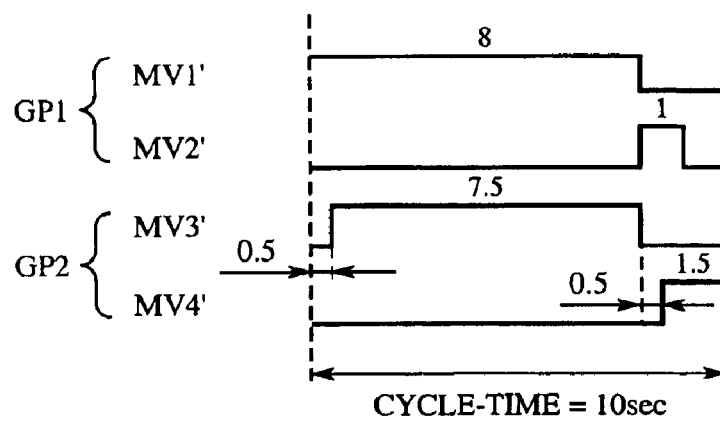
FIG. 19 is a time chart of an operation of the state control apparatus in FIG. 3 when the "grouping" parameter and the "interchannel activation time lag" parameter are utilized.

With reference to the time chart in FIG. 19, an example of operation using the "grouping" parameter and the "interchannel activation time lag" parameter will be described. The example of FIG. 19 is based on parameter settings (see FIG. 5) wherein the "cycle-time" is 10 seconds, the "grouping" is "use", "group GP1" includes channels CH1 and CH2, "group GP2" includes channels CH3 and CH4, the "deactivation-to-activation time lag" is null (0 seconds), the "output-restriction" parameters are null (100%) for all channels, the "mode" is mode A (specific channel preferential mode), and the "interchannel activation time lag" is 0.5 seconds. In this case, by virtue of setting the specific channel preferential mode, channel CH1 is also preferential in group GP1 and channel CH3 is preferential in group GP2.

Let us assume that before the cycle-time in FIG. 19, the PID calculator 36 in the processor 31 has calculated the adjustment amount MV1 at 80% for the heater 21A per cycle-time while the PID calculator 36 in the processor 32 has calculated the adjustment amount MV2 at 10% for the heater 22A. Furthermore, let us assume that the adjustment amount MV3 is calculated at 75% for the heater 23A while the adjustment amount MV4 is calculated at 80% for the heater 24A.

Concerning group GP1, the main controller 60 of the time-division controller 29 calculates the actual activation time period LMV1' for the overriding heater 21A at 8 seconds, which is the product of 10 seconds (one cycle-time) and 80% (MV1). Then, the main controller 60 calculates the actual activation time period LMV2' for the remaining heater 22A at 1 second, which is the product of 10 seconds (one cycle-time) and 10% (MV2). The main controller 60 allocates one cycle-time (10 seconds) among the actual activation time periods LMV1' and LMV2' thus obtained in such a manner that the periods do not overlap with each other.

Concerning group GP2, the main controller 60 of the time-division controller 29 calculates the actual activation time period LMV3' for the overriding heater 23A at 7.5 seconds, which is the product of 10 seconds (one cycle-time) and 75% MV3). Since the "interchannel activation time lag" parameter is 0.5 seconds, the commencement of the activation period LMV3' must lag 0.5 seconds behind that of the activation period LMV1'. Then, the termination of the activation period LMV3' synchronizes with the commencement of the activation period LMV2'. However, by setting the "interchannel activation time lag" parameter, the heater 24A must not be activated simultaneously with or directly after the expiration of the activation period LMV3'. Accordingly, the available remaining period is no more than 1.5 seconds for group GP2. Although the main controller 60 calculates the actual activation time period LMV4' for the remaining heater 24A at 8 second (80% (MV4) of the product of 10 seconds), the main controller 60 cuts down the activation time period LMV4' to 1.5 seconds since the available remaining period is 1.5 seconds only. As described above, the main controller 60 can allocate one cycle-time (10 seconds) among the actual activation time periods LMV3' and LMV4'.

As described above, using the "interchannel activation time lag" parameter prevents a plurality of heaters belonging to different groups from starting to activate simultaneously although parallel processing is conducted by the "grouping." In general, at the moment of starting up a heater, striking current flows which are considerably greater than the steady-state current and results in a momentary upsurge of power consumption. Using the "interchannel activation time lag" parameter may minimize the increase in power consumption.

The "interchannel activation time lag" parameter can be utilized not only in the specific channel preferential mode, but also in the aforementioned required-adjustment amount proportion mode, combination mode, and time allocation mode. In addition, this parameter may be concomitantly used with the aforementioned "deactivation-to-activation time lag" parameter and the "output-restriction" parameter.

In the above described example, the "interchannel activation time lag" parameter is common to all channels. However, it is possible to use a plurality of "interchannel activation time lag" parameters for a plurality of combinations of concurrently activable channels (for example, the combination of channels 1 and 3 and the combination of channels 2 and 4).

Figure 11:
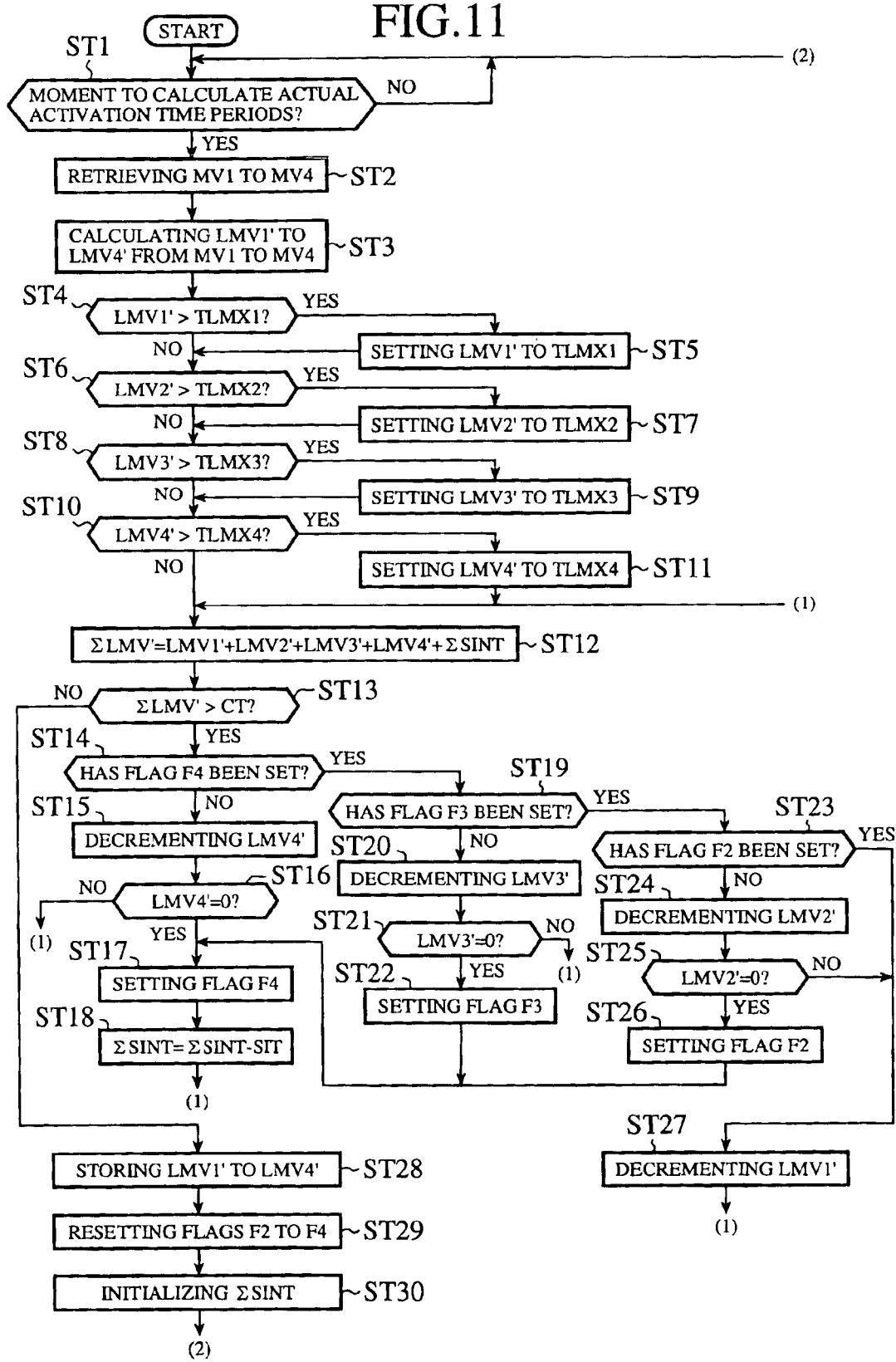
FIG. 11 is a flow chart illustrating an activation-period calculation routine for achieving the specific channel preferential mode shown in FIGS. 6 through 8.

When the aforementioned "grouping" parameter is used, the routine for calculating respective activation periods may be obtained by minor modification of any of the above-described activation period routines, for example, illustrated in FIG. 11, 14, or 16. More specifically, after grouping the heaters, the activation periods for respective heaters in the first group are calculated, and then the activation periods for respective heaters in the remaining group(s) are calculated. When the "interchannel activation time lag" parameter and/or the "deactivation-to-activation time lag" parameter is used, the commencement and termination moments for the heaters of a later group are determined directly after the activation periods are calculated for the heaters of the preceding group. The determined commencement and termination moments may be referred to and utilized for the calculation of the activation periods for the heaters of the later group.

Figure 12:
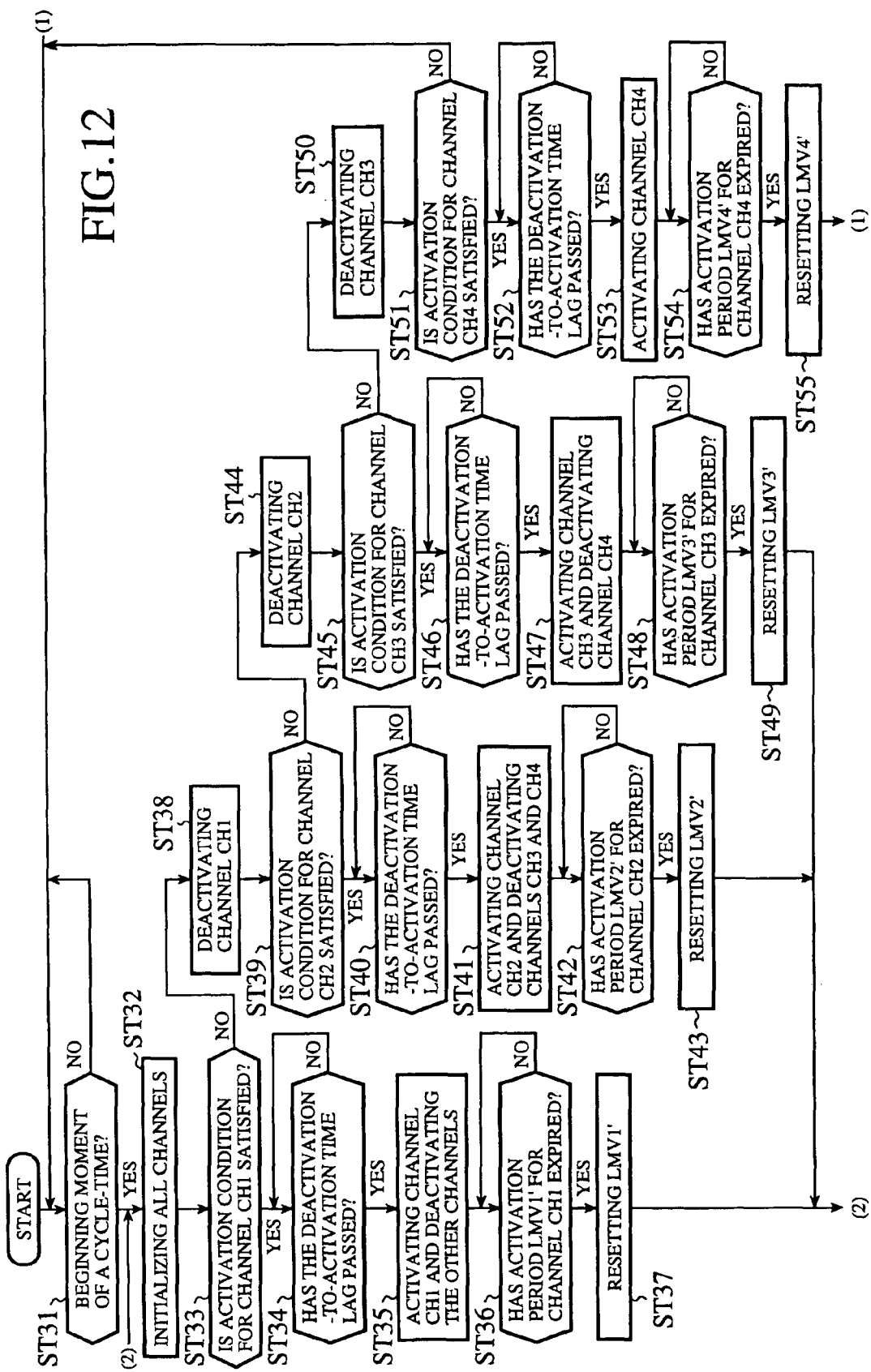
FIG. 12 is a flow chart illustrating an activating routine for achieving the specific channel preferential mode shown in FIGS. 6 through 8.

In order to activate the heaters of respective groups on the basis of the actual activation time periods MV1' through MV4' thus obtained, parallel processing may be performed in which an activating routine similar to that described with reference to FIG. 12 is executed for each group. For this purpose, the time-division controller 29 may be provided with a parallel processor. However, the "activation condition" used at steps ST33 and ST39 in FIG. 12 should include that the activation start of a heater must lag behind the activation start moment of another heater of another group in order to utilize the "interchannel activation time lag" parameter in the activating routine similar to that described with reference to FIG. 12.

The manner for grouping is not limited to that described above. For example, channels CH1 and CH4 may form group GP1 while channels CH2 and CH3 may form group GP2. Alternatively, only channel CH1 may form group GP1 while channels CH2 through CH4 may form group GP2. If there are more channels, it is possible to increase the number of groups.

Furthermore, an operation of an immediate control mode in the temperature control apparatus will be described.

The immediate control mode corresponds to mode E in FIG. 5. In every above-described mode, the activation periods LMV1' through LMV4' are calculated prior to a corresponding cycle-time for activating the heaters. On the contrary, in the immediate control mode, the main controller 60 decides whether or not each of the heaters 21A through 24A should be activated in the course of a corresponding cycle-time. Generally, in a state control apparatus, a processor may sample a measured quantity in every sampling cycle that is appreciably shorter than an activation cycle-time. In the immediate control mode in the present state control apparatus, each of the processors 31 through 34 also samples the deviation amount ER1, ER2, ER3, or ER4 output from each of the subtracters 41 through 44 in every sampling cycle (for example, 500 msec) that is considerably shorter than the cycle-time. Each of the processors 31 through 34 uses the corresponding PID calculator 36 (see FIG. 4) that calculates the adjustment amount on the basis of the corresponding deviation amount ER1, ER2, ER3, or ER4 and supplies the adjustment amount to the corresponding buffer 61, 62, 63, or 64 in the time-division controller 29. Each of the processors 31 through 34 renews the corresponding adjustment amount in each sampling cycle in the immediate control mode.

The main controller 60 reads the adjustment amounts from the buffers 61 through 64 in each sampling cycle in the course of one cycle-time, and determines whether or not the heaters 21A through 24A should be activated on the basis of the parameters from the interface controller 28 and the adjustment amounts at the time.

If the immediate control mode is chosen, the interface controller 28 produces immediate control parameters corresponding to this mode, and supplies the immediate control parameters to the time-division controller 29. The immediate control parameters include a prioritization parameter that defines order of precedence among the end effecting devices (heaters). In the immediate control mode, for example, heaters of lower-numbered channels within the channels CH1 through CH4 are prioritized. In addition, the interface controller 28 generates a mode parameter MP indicating that the PID calculators 36 of the processors 31 through 34 should be selected, and supplies the mode parameter MP to the processors 31 through 34.

With reference to the time chart in FIG. 20, an operation of the immediate control mode will be described. The example of FIG. 20 is based on parameter settings (see FIG. 5) wherein the "cycle-time" is 10 seconds, the "grouping" is "use" (channels CH1 through CH4 in FIG. 20 belong to one group), the "deactivation-to-activation time lag" is 0.5 seconds, the "output-restriction" parameters are null (100%) for all channels, and the "mode" is mode E (immediate control mode).

As described above, the main controller 60 decides whether or not each of the heaters 21A through 24A should be activated in each sampling cycle in the course of a corresponding cycle-time. The prioritization parameter in the immediate control parameters is used as a material for the decision. More specifically, when the adjustment amounts indicates that a plurality of heaters should be activated, a heater of lower-numbered channel is preferentially activated while the heaters of the other channels are inactivated.

Figure 20:
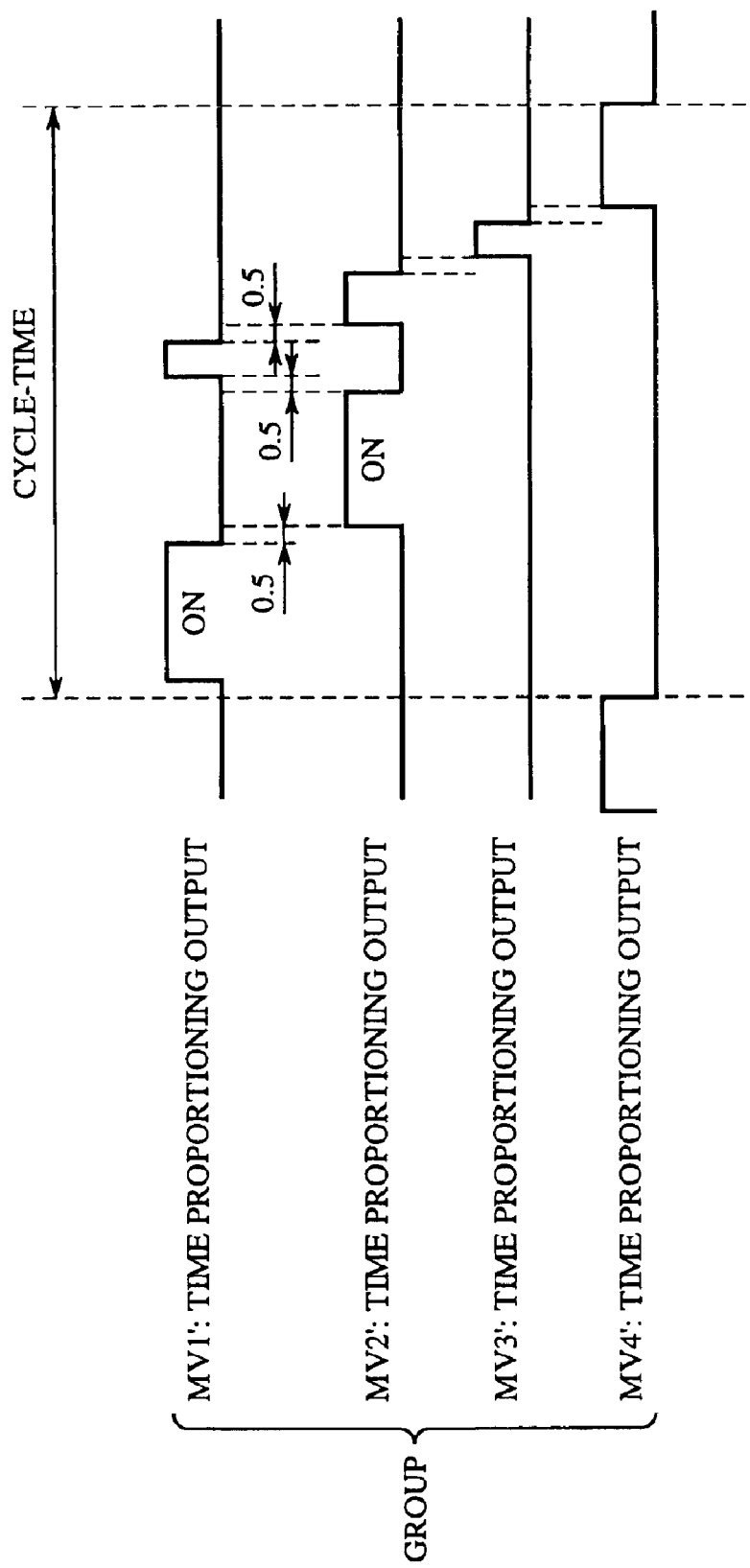
FIG. 20 is a time chart of an operation in an immediate control mode of the state control apparatus in FIG. 3.

In the cycle-time of FIG. 20, the main controller 60 activates the heater of the channel CH1 in the first instance. When the channel CH1 is activated, the main controller 60 inactivates the heaters of the other channels compulsorily although the main controller 60 evaluates that they should be activated. After the completion of the activation of the channel CH1, once the deactivation-to-activation time lag (0.5 seconds) lapses, the main controller 60 commences activating the channel CH2. When the channel CH2 is activated, the heaters of the subordinate channels CH3 and CH4 are inactivated compulsorily although the main controller 60 evaluates that they should be activated.

However, when the main controller 60 evaluates that the overriding channel CH1 should be activated, the main controller 60 deactivates the subordinate channels including the channel CH2 in the course of activating the channel CH2. After the lapse of the deactivation-to-activation time lag (0.5 seconds), the main controller 60 starts activating the channel CH1 although the same cycle-time has not yet expired. After the completion of the reactivation of the channel CH1, once the deactivation-to-activation time lag (0.5 seconds) lapses, the main controller 60 recommences activating the channel CH2. At length, the subordinate channels CH3 and CH4 are activated after the completion of activating the overriding channels CH1 and CH2.

Figure 21:
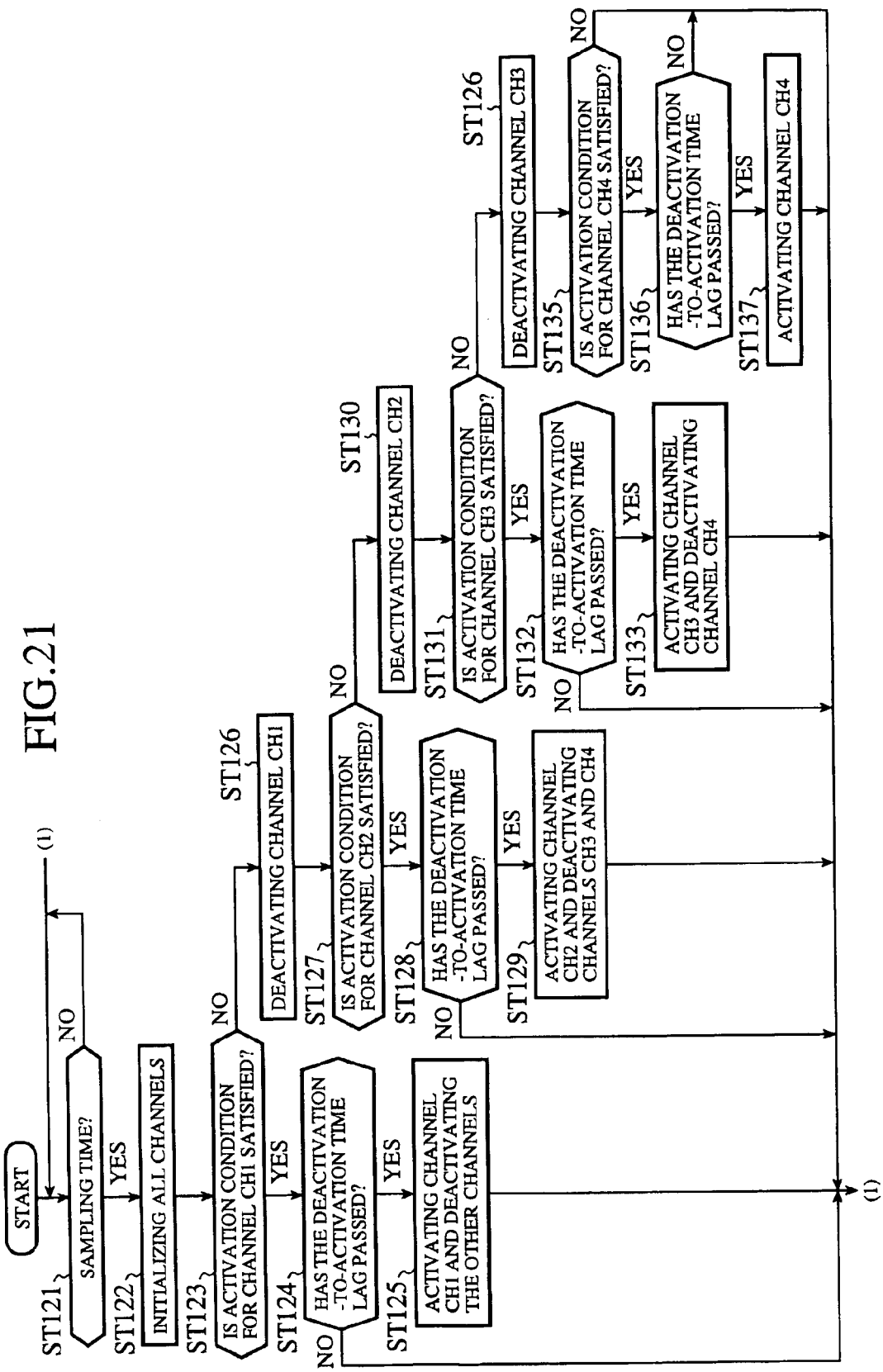
FIG. 21 is a flow chart illustrating an activating routine for achieving the immediate control mode shown in FIG. 20.

With reference to FIG. 21, an activating routine executed by the main controller 60 of the time-division controller 29 in the immediate control mode will be described.

In this routine, at step ST121, the main controller 60 determines whether or not the present moment is the sampling time, referring to its built-in timer. If the determination is affirmative, the main controller 60 initializes the heaters 21A through 24A of all channels CH1 through CH4 at step ST122.

Next, at step ST123, the main controller 60 determines whether or not the "activation condition" is satisfied in connection with the heater 21A of the channel CH1. If the determination is affirmative, the routine proceeds to step ST124 where the main controller 60 determines whether or not the "deactivation-to-activation time lag" has lapsed. If the determination is affirmative, the routine proceeds to step ST125 where the main controller 60 activates the relay 51 for channel CH1 and deactivates the relays 52 through 54 for the other channels, so as to activate the heater 21A only. Then, the routine returns to step ST121 for waiting for the next sampling time.

On the other hand, if the determination at step ST124 is negative, the routine returns to step ST121 for waiting for the next sampling time. Accordingly, unless the "deactivation-to-activation time lag" lapses, the routine does not proceed to step ST125.

If the "activation condition" for the heater 21A of channel CH1 is not satisfied at step ST123, the determination is negative and the routine proceeds to step ST126 for deactivating the channel CH1.

Next, at step ST127, the main controller 60 determines whether or not the "activation condition" is satisfied in connection with the heater 22A of channel CH2. If the determination is affirmative, the routine proceeds to step ST128 where the main controller 60 determines whether or not the "deactivation-to-activation time lag" has lapsed. If the determination is affirmative, the main controller 60 activates the relay 52 for channel CH2 and deactivates the relays 53 and 54 for the other channels at step ST129, so as to activate the heater 22A only.

In similar fashion, when the "activation conditions" for the channels CH1 and CH2 are not satisfied, the routine proceeds to step ST130. If the "activation condition" for the heater 23A of channel CH3 is satisfied at step ST130, the main controller 60 activates the relay 53 for channel CH3 and deactivates the relay 54 for the channel CH4 after the lapse of "deactivation-to-activation time lag," so as to activate the heater 23A only (steps ST131, ST132, and ST133).

Furthermore, when the "activation condition" for the channels CH1 through CH3 is not satisfied, the routine proceeds to step ST134. If the "activation condition" for the heater 24A of channel CH4 is satisfied at step ST134, the main controller 60 activates the relay 54 to activate only the heater 24A after the lapse of "deactivation-to-activation time lag" (steps ST135, ST136, and ST137).

As described above, in the immediate control mode, the harmonic activation of heaters are realized using the "deactivation-to-activation time lag" parameter. In the activating routine described with reference to FIG. 21, a channel is not activated unless the activation period for the former channel has not expired and the "deactivation-to-activation time lag", if any, has not expired. Therefore, power consumption is prevented from increasing abruptly.

Figure 22:
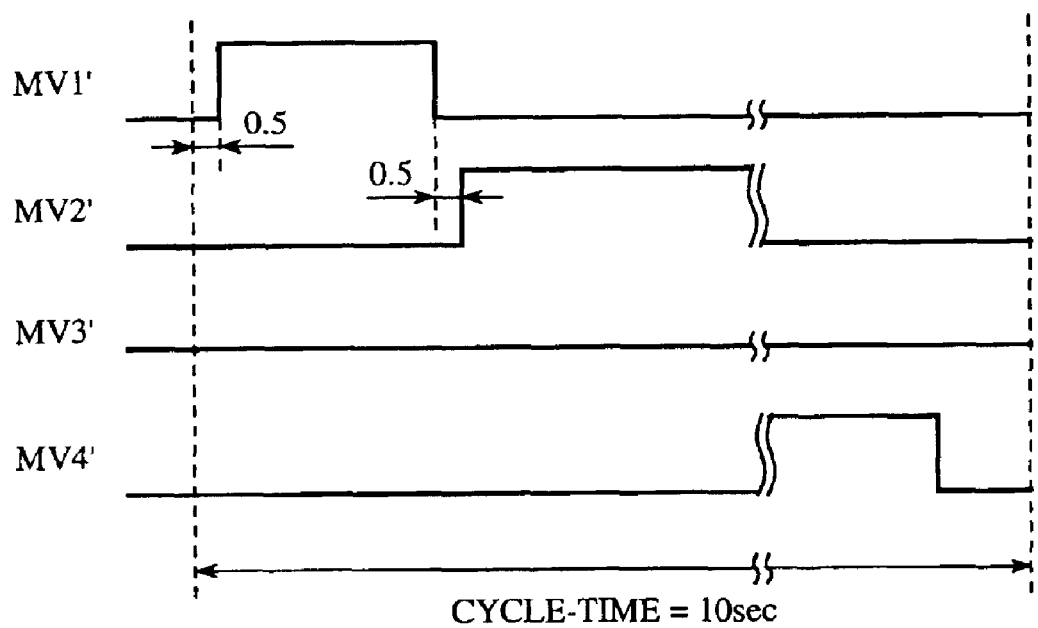
FIG. 22 is a time chart of an operation in a sequential output decision mode of the state control apparatus in FIG. 3.

Furthermore, an operation of a sequential output decision mode in the temperature control apparatus will be described. The sequential output decision mode is a variation of the aforementioned immediate control mode. In the aforementioned immediate control mode, heaters (especially, the heaters for overriding channels) may be activated multiple times in even one cycle-time (see FIG. 20). However, in the sequential output decision mode, as illustrated in FIG. 22, all heaters are restricted to be activated once at the maximum in one cycle-time.

As similar to the aforementioned immediate control mode, the processors 31 through 34 generates and outputs the adjustment amounts MV1 through MV4 in each sampling cycle (for example, 500 msec) in the sequential output decision mode. However, differently from the immediate control mode, the main controller 60 of the time-division controller 29 decides whether or not the respective heaters 21A through 24A should be activated on the basis of the parameters from the interface controller 28 and the adjustment amounts MV1, MV2 , MV3, and MV4 in every decision cycle for example, 10 msec) that may be different from the sampling cycle. In addition, the main controller 60 outputs any one of the activating signals MV1', MV2', MV3' and MV4' per each decision cycle. Other general features of the sequential output decision mode are common to those of the immediate control mode. The example of FIG. 22 may be based on parameter settings that are the same as those described with reference to FIG. 20.

Figure 23:
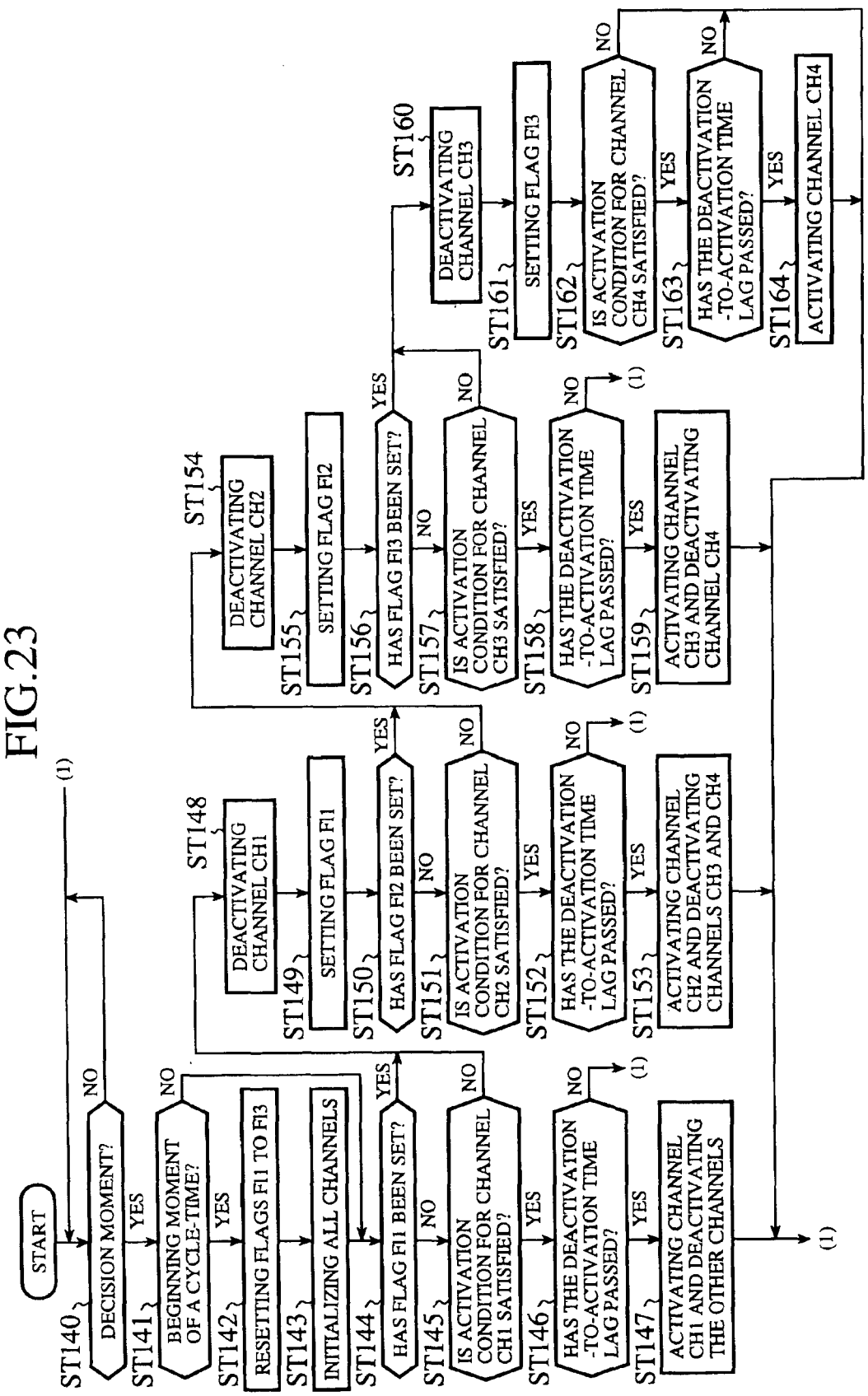
FIG. 23 is a flow chart illustrating an activating routine for achieving the sequential output decision mode shown in FIG. 22.

With reference to FIG. 23, an activating routine executed by the main controller 60 of the time-division controller 29 in the sequential output decision mode will be described.

In this routine, at step ST140, the main controller 60 first determines whether or not the present moment is the decision moment (the decision cycle is, e.g., 10 msec), referring to its built-in timer. If the determination is affirmative, the main controller 60 determines at step ST142 that whether or not the present moment is the beginning moment of a cycle-time, referring to its built-in timer. If the determination at step ST141 is affirmative, the main controller 60 resets the flags Fl1 through Fl3, which will be described later, at step ST142, and initializes the heaters 21A through 24A for all channels CH1 through CH4 at step ST143., Next, the routine proceeds to step ST144.

On the contrary, if the determination at step ST141 is negative, the routine directly proceeds to step ST144. Consequently, at only the beginning moment of each cycle-time, flags are reset and all channels are initialized.

At step ST144, the main controller 60 decides whether flag Fl1 has been set or not. Flag Fl1 indicates the status wherein the heater 21A of channel CH1 should not be activated. More specifically, after expiration of the activation of the heater 21A, flag Fl1 is set in order to inhibit the heater 21A from being activated again in the same cycle-time. If the decision at step ST144 is negative, the routine proceeds to step ST145.

At step ST145, the main controller 60 determines whether or not the "activation condition" is satisfied in connection with the heater 21A of channel CH1. If the determination is affirmative, the routine proceeds to step ST146 where the main controller 60 determines whether or not the "deactivation-to-activation time lag" has lapsed. If the determination is also affirmative, the routine proceeds to step ST147. At step ST147, the main controller 60 activates the relay 51 for channel CH1 and deactivates the relays 52 through 54 for the other channels to activate only the heater 21A of the highest priority. Then, the routine returns to step ST141 for waiting for the next decision moment.

On the contrary, if the determination at step ST146 is negative, the routine returns to step ST140 for waiting for the next decision moment. Accordingly, unless the "deactivation-to-activation time lag" lapses, the routine does not proceed to step ST147.

If flag Fl1 has been set, the decision at step ST144 is affirmative. If the "activation condition" is satisfied in connection with the heater 21A of channel CH1, the decision at step ST145 is negative. In these events, the routine proceeds to step ST148 to deactivate channel CH1. Next, the flag Fl1 is set at step ST149.

Next, at step ST150, the main controller 60 determines whether or not flag Fl2 has been set. Flag Fl2 indicates that the heater 22A of channel CH2 should not be activated. If the decision at step ST150 is negative, the routine proceeds to step ST151. At step ST151, the main controller 60 determines whether or not the "activation condition" is satisfied in connection with the heater 22A of channel CH2. If the determination is affirmative, the routine proceeds to step ST152 where the main controller 60 determines whether or not the "deactivation-to-activation time lag" has lapsed. If the determination is affirmative, the main controller 60 activates the relay 52 for channel CH2 and deactivates the relays 53 and 54 for other channels at step ST153, so as to activate the heater 22A only.

Similarly, when the "activation conditions" for channels CH1 and CH2 are not satisfied, or when channels CH1 and CH2 should not be activated, the routine proceeds to step ST154 for deactivating the heater 22A of channel CH2, and then to step ST155 for setting flag Fl2.

If flag Fl3 has not been set and the "activation condition" for the heater 23A of channel CH3 is satisfied, the main controller 60 activates the relay 53 for channel CH3 and deactivates the relay 54 for channel CH4 after the lapse of the "deactivation-to-activation time lag," so as to activate the heater 23A only (steps ST156 through ST159).

Furthermore, when the "activation conditions" for channels CH1 through CH3 are not satisfied, or when channels CH1 through CH3 should not be activated, the routine proceeds to step ST160 for deactivating the heater 23A of channel CH3, and then to step 161 for setting flag Fl3. When the "activation condition" for the heater 24A of channel CH4 is satisfied, the main controller 60 activates the relay 54 of channel CH4 to activate only the heater 24A after the lapse of the "deactivation-to-activation time lag" (steps ST162, ST163, and ST164).

As described above, in the sequential output decision mode, the harmonic activation of heaters are realized using the "deactivation-to-activation time lag" parameter. In the activating routine described with reference to FIG. 23, a channel is not activated unless the activation period for the former channel has not expired and the "deactivation-to-activation time lag", if any, has not expired. Therefore, power consumption is prevented from increasing abruptly.

Besides the above-described various control modes, the temperature control apparatus according to the embodiment may operate in an independent control mode wherein the respective heaters 21A through 21D are independently controlled. In the independent control mode, when it is determined that any heaters should be activated, they can be activated independently of the activation periods for other heaters. Accordingly, while the independent control mode can give the individual heaters optimal responses, the other control modes bring power saving effect.

While a preferred embodiment has been described by way of illustration of the present invention, it will be understood by those having ordinary skill in the art that various changes, modifications, and alterations may be made without departing from the spirit and scope of the invention as herein after claimed.

INDUSTRIAL APPLICABILITY

As described above, the state control apparatus according to the present invention can activate and control a plurality of end effecting devices harmonically on the basis of various factors under restricted power consumption.

What is claimed is:

1. A state control apparatus comprising:
a calculator for calculating adjustment amounts for adjusting a plurality of end effecting devices on the basis of preset values and measured amounts measured by a plurality of meters, the measured amounts indicating respective states of the end effecting devices, the adjustment amounts being required for conforming the measured amounts to the preset values, respectively;
a parameter generator for generating a plurality of parameters on the basis of settings by a user, the parameters including a prioritization parameter indicating a prioritization among the end effecting devices; and
a comprehensive controller for outputting activating signals for activating the respective end effecting devices based on the respective adjustment amounts and the plurality of parameters, wherein when the comprehensive controller outputs one of the activating signals for activating one of the end effecting devices, the comprehensive controller does not output the other activating signals for activating the other end effecting devices,
wherein the comprehensive controller preferentially outputs the activating signal for activating the end effecting device having a higher priority indicated by the prioritization parameter in a cycle-time that is capable of being allocated for activating the end effecting devices sequentially, wherein the comprehensive controller outputs the other activating signal for activating the remaining end effecting devices having lower priorities indicated by the prioritization parameter in a remaining period in the cycle-time after a period for outputting the activating signal for activating the end effecting device having the higher priority, and wherein the comprehensive controller allocates the remaining period among activation periods for the remaining end effecting devices in such a manner that the respective activation periods for the remaining end effecting devices are proportional to the corresponding adjustment amounts.

2. A state control apparatus comprising:
a calculator for calculating adjustment amounts for adjusting a plurality of end effecting devices on the basis of preset values and measured amounts measured by a plurality of meters, the measured amounts indicating respective states of the end effecting devices, the adjustment amounts being required for conforming the measured amounts to the preset values, respectively;
a parameter generator for generating a plurality of parameters on the basis of settings by a user, the parameters including a limitation parameter corresponding to a limitation of time period for activating at least one of the end effecting devices in a cycle-time that is capable of being allocated for activating the end effecting devices sequentially; and
a comprehensive controller for outputting activating signals for activating the respective end effecting devices based on the respective adjustment amounts and the plurality of parameters, wherein when the comprehensive controller outputs one of the activating signals for activating one of the end effecting devices, the comprehensive controller does not output the other activating signals for activating the other end effecting devices,
and wherein the comprehensive controller adjusts outputs of the activating signals for the end effecting devices on the basis of the parameters including the limitation parameter.

3. A state control apparatus comprising:
a calculator for calculating adjustment amounts for adjusting a plurality of end effecting devices on the basis of preset values and measured amounts measured by a plurality of meters, the measured amounts indicating respective states of the end effecting devices, the adjustment amounts being required for conforming the measured amounts to the preset values, respectively;

a parameter generator for generating a plurality of parameters on the basis of settings by a user, the parameters including a limitation parameter corresponding to a limitation of time period for activating at least one of the end effecting devices in a cycle-time that is capable of being allocated for activating the end effecting devices sequentially, and a prioritization parameter indicating a prioritization among the end effecting devices; and a comprehensive controller for outputting activating signals for activating the respective end effecting devices based on the respective adjustment amounts and the plurality of parameters, wherein when the comprehensive controller outputs one of the activating signals for activating one of the end effecting devices, the comprehensive controller does not output the other activating signals for activating the other end effecting devices, and wherein the comprehensive controller adjusts outputs of the activating signals for the end effecting devices on the basis of the limitation parameter and the prioritization parameter.

4. The state control apparatus as recited in claim 3, wherein the comprehensive controller preferentially outputs the activating signal for activating the end effecting device having a higher priority indicated by the prioritization parameter in the cycle-time, and wherein the comprehensive controller does not output the other activating signal for activating the other end effecting device having a lower priority indicated by the prioritization parameter in the cycle-time when the cycle-time is occupied with a period for outputting the activating signal for activating the end effecting device having the higher priority.

5. The state control apparatus as recited in claim 3, wherein the comprehensive controller preferentially outputs the activating signal for activating the end effecting device having a higher priority indicated by the prioritization parameter in the cycle-time, and wherein the comprehensive controller outputs the other activating signal for activating the remaining end effecting devices having lower priorities indicated by the prioritization parameter in a remaining period in the cycle-time after a period for outputting the activating signal for activating the end effecting device having the higher priority.

6. The state control apparatus as recited in claim 5, wherein the comprehensive controller allocates the remaining period among activation periods for the remaining end effecting devices in such a manner that the respective activation periods for the remaining end effecting devices are proportional to the corresponding adjustment amounts.

7. A state control apparatus comprising:

a calculator for calculating adjustment amounts for adjusting a plurality of end effecting devices on the basis of preset values and measured amounts measured by a plurality of meters, the measured amounts indicating respective states of the end effecting devices, the adjustment amounts being required for conforming the measured amounts to the preset values, respectively;

a parameter generator for generating a plurality of parameters on the basis of settings by a user; and a comprehensive controller for outputting activating signals for activating the respective end effecting devices based on the respective adjustment amounts and the plurality of parameters, wherein when the comprehensive controller outputs one of the activating signals for activating one of the end effecting devices, the comprehensive controller does not output the other activating signals for activating the other end effecting devices, and wherein when a sum of the adjustment amounts for the end effecting devices is in excess of an amount corresponding to a length of a cycle-time that is capable of being allocated for activating the end effecting devices sequentially, the comprehensive controller multiplies each ratio of each adjustment amount to the sum of the adjustment amounts with the length of the cycle-time, thereby obtaining each activation period for each end effecting device.

8. A state control apparatus comprising:

a calculator for calculating adjustment amounts for adjusting a plurality of end effecting devices on the basis of preset values and measured amounts measured by a plurality of meters, the measured amounts indicating respective states of the end effecting devices, the adjustment amounts being required for conforming the measured amounts to the preset values, respectively;

a parameter generator for generating a plurality of parameters on the basis of settings by a user;

a comprehensive controller for outputting activating signals for activating the respective end effecting devices based on the respective adjustment amounts and the plurality of parameters, wherein when the comprehensive controller outputs one of the activating signals for activating one of the end effecting devices, the comprehensive controller does not output the other activating signals for activating the other end effecting devices; and an activation decider for generating information, which indicates whether or not each and effecting device should be activated, on the basis of the states measured by the meters, the activation decider and the calculator being used alternatively, wherein the parameter generator generates a mode parameter indicating to use either the activation decider or the calculator, and generates a limitation parameter corresponding to a limitation of time period for activating at least one of the end effecting devices in cycle-time that is capable of being allocated for activating the end effecting devices sequentially when the activation decider is used, and wherein the comprehensive controller allocates the cycle-time among activation periods for activating the end effecting devices on the basis of the parameters including the limitation parameter when the activation decider is used.

9. A state control apparatus comprising:

a calculator for calculating adjustment amounts for adjusting a plurality of end effecting devices on the basis of preset values and measured amounts measured by a plurality of meters, the measured amounts indicating respective states of the end effecting devices, the adjustment amounts being required for conforming the measured amounts to the preset values, respectively;

a parameter generator for generating a plurality of parameters on the basis of settings by a user; and a comprehensive controller for outputting activating signals for activating the respective end effecting devices based on the respective adjustment amounts and the plurality of parameters, wherein when the comprehensive controller outputs one of the activating signals for activating one of the end effecting devices, the comprehensive controller does not output the other activating signals for activating the other end effecting devices, wherein the parameter generator generates a grouping parameter indicating a manner for grouping the end effecting devices when the end effecting devices are classified into a plurality of groups, and wherein when the comprehensive controller outputs one of the activating signals for activating one of the end effecting devices belonging to a group, the comprehensive controller does not output the other activating signals for activating the other end effecting devices belonging to the same group.

10. The state control apparatus as recited in claim 9, wherein the parameter generator generates a prioritization parameter indicating a prioritization among the end effecting devices in each group, and wherein the comprehensive controller adjusts respective activations of the end effecting devices in each group on the basis of the parameters including the prioritization parameter.

11. The state control apparatus as recited in claim 10, wherein the comprehensive controller preferentially outputs the activating signal for activating the end effecting device having a higher priority in each group indicated by the prioritization parameter in a cycle-time that is capable of being allocated for activating the end effecting devices in each group sequentially, and wherein the comprehensive controller does not output the other activating signal for activating the other end effecting device having a lower priority in each group indicated by the prioritization parameter in the cycle-time when the cycle-time is occupied with a period for outputting the activating signal for activating the end effecting device having the higher priority.

12. The state control apparatus as recited in claim 10, wherein the comprehensive controller preferentially outputs the activating signal for activating the and effecting device having a higher priority in each group indicated by the prioritization parameter in a cycle-time that is capable of being allocated for activating the end effecting devices sequentially, and wherein the comprehensive controller outputs the other activating signal for activating the remaining end effecting devices having lower priorities in each group indicated by the prioritization parameter in a remaining period in the cycle-time after a period for outputting the activating signal for activating the end effecting device having the higher priority.

13. The state control apparatus as recited in claim 9, wherein the comprehensive controller differentiates an activating start moment of an end effecting device belonging to a group from that of another end effecting device belonging to another group.

14. A state control apparatus comprising:
a calculator for calculating adjustment amounts for adjusting a plurality of end effecting devices on the basis of preset values and measured amounts measured by a plurality of meters, the measured amounts indicating respective states of the end effecting devices, the adjustment amounts being required for conforming the measured amounts to the preset values, respectively;
a parameter generator for generating a plurality of parameters on the basis of settings by a user, and
a comprehensive controller for outputting activating signals for activating the respective end effecting devices based on the respective adjustment amounts and the plurality of parameters, wherein when the comprehensive controller outputs one of the activating signals for activating one of the end effecting devices, the comprehensive controller does not output the other activating signals for activating the other end effecting devices, and wherein the comprehensive controller delays a start moment of outputting the activating signal for an end effecting device.

15. A state control apparatus comprising:
a calculator for calculating adjustment amounts for adjusting a plurality of end effecting devices on the basis of preset values and measured amounts measured by a plurality of meters, the measured amounts indicating respective states of the end effecting devices, the adjustment amounts being required for conforming the measured amounts to the preset values, respectively;
a parameter generator for generating a prioritization parameter indicating a prioritization among the end effecting devices on the basis of settings by a user, and
a comprehensive controller for deciding which end effecting device to activate actually on the basis of the adjustment amounts and the prioritization parameter in the course of a cycle-time that is a reference time for activating the end effecting devices, wherein when the comprehensive controller activates one of the end effecting devices, the comprehensive controller deactivates the other end effecting devices.

16. The state control apparatus as recited in claim 15, wherein the comprehensive controller activates the end effecting device having a higher priority indicated by the prioritization parameter and deactivates the other end effecting devices when the adjustment amounts indicate a plurality of end effecting devices should be activated.

* * * * *